(12) United States Patent
Bhorkar et al.

(10) Patent No.: US 10,757,664 B2
(45) Date of Patent: Aug. 25, 2020

(54) CONTENTION FREE PHYSICAL UPLINK SHARED CONTROL CHANNEL (PUSCH) TRANSMISSION USING LISTEN BEFORE TALK

(71) Applicant: Apple Inc., Cupertino, CA (US)

(72) Inventors: Abhijeet Bhorkar, Fremont, CA (US); Christian Ibars Casas, Santa Clara, CA (US); Seunghee Han, San Jose, CA (US)

(73) Assignee: APPLE INC., Cupertino, CA (US)

( * ) Notice: Subject to any disclaimer, the term of this patent is extended or adjusted under 35 U.S.C. 154(b) by 65 days.

(21) Appl. No.: 15/566,511

(22) PCT Filed: Dec. 24, 2015

(86) PCT No.: PCT/US2015/000427
§ 371 (c)(1),
(2) Date: Oct. 13, 2017

(87) PCT Pub. No.: WO2016/182533
PCT Pub. Date: Nov. 17, 2016

(65) Prior Publication Data
US 2018/0302868 A1 Oct. 18, 2018

Related U.S. Application Data

(60) Provisional application No. 62/161,587, filed on May 14, 2015.

(51) Int. Cl.
*H04W 56/00* (2009.01)
*H04L 1/18* (2006.01)
(Continued)

(52) U.S. Cl.
CPC ....... *H04W 56/0005* (2013.01); *H04L 1/1887* (2013.01); *H04L 5/0051* (2013.01);
(Continued)

(58) Field of Classification Search
None
See application file for complete search history.

(56) References Cited

U.S. PATENT DOCUMENTS

| 2007/0002890 A1* | 1/2007 | Mangold | H04W 8/22 370/459 |
| 2012/0263055 A1* | 10/2012 | Liu | H04W 52/0212 370/252 |

(Continued)

FOREIGN PATENT DOCUMENTS

| CN | 101932103 A | 12/2010 |
| CN | 103703817 A | 4/2014 |

(Continued)

OTHER PUBLICATIONS

3GPP TSG-RAN WG2 #89 (R2-150548); Discussion on LAA issues; Source: HTC; Agenda Item 7.1; Athens, Greece; Feb. 9-13, 2015.

(Continued)

*Primary Examiner* — Rebecca E Song

(57) ABSTRACT

Technology for contention free physical uplink shared control channel (PUSCH) transmission using listen before talk procedure is disclosed. In an example, an apparatus of a user equipment (UE) having circuitry configured to achieves low latency synchronization with an anchor enhanced Node (eNB) by sensing for a predetermined time period if any physical uplink shared channels (PUSCH) are idle with the anchor eNB for uplink (UL) synchronization; providing a unique UE identification in a PUSCH transmission; and communicating the PUSCH transmission in one of the idle PUSCH channels for contention free communication with the anchor eNB for uplink synchronization.

35 Claims, 12 Drawing Sheets

(51) Int. Cl.
*H04L 5/00* (2006.01)
*H04W 72/04* (2009.01)
*H04W 74/04* (2009.01)
*H04W 74/08* (2009.01)

(52) U.S. Cl.
CPC ....... *H04L 5/0055* (2013.01); *H04W 72/0446* (2013.01); *H04W 74/04* (2013.01); *H04W 74/0808* (2013.01)

(56) References Cited

U.S. PATENT DOCUMENTS

| | | | |
|---|---|---|---|
| 2012/0269285 A1* | 10/2012 | Jeong | H04L 5/0007 375/295 |
| 2012/0307760 A1* | 12/2012 | Han | H04L 5/0055 370/329 |
| 2014/0269317 A1* | 9/2014 | Wang | H04L 69/04 370/235 |
| 2015/0092703 A1* | 4/2015 | Xu | H04L 5/003 370/329 |
| 2016/0119920 A1* | 4/2016 | Mallik | H04L 5/0048 370/336 |
| 2016/0278049 A1* | 9/2016 | Nory | H04L 27/0006 |
| 2016/0278050 A1* | 9/2016 | Nory | H04W 16/14 |
| 2016/0278088 A1* | 9/2016 | Cheng | H04L 47/27 |
| 2016/0302225 A1* | 10/2016 | Damnjanovic | H04W 72/1284 |
| 2017/0325215 A1* | 11/2017 | Takeda | H04W 74/08 |
| 2018/0124749 A1* | 5/2018 | Park | H04W 74/08 |
| 2018/0199351 A1* | 7/2018 | Ro | H04W 72/10 |
| 2018/0249494 A1* | 8/2018 | Matsumoto | H04W 56/0005 |

FOREIGN PATENT DOCUMENTS

| | | |
|---|---|---|
| WO | 2013096551 A1 | 6/2013 |
| WO | 2016040254 A2 | 3/2016 |

OTHER PUBLICATIONS

3GPP TSG RAN WG1 Ad-hoc Meeting (R1-151027); Analysis on potential issues and solutions for LAA UL transmission; Source: ZTE; Agenda Item 2.2; Paris, France; Mar. 24-26, 2015.

3GPP TSG-RAN WG2 #89bis (R2-151102); Uplink transmission with LBT; Source: Intel Corporation; Agenda Item 7.1.3; Bratislava, Slovakia; Apr. 20-24, 2015.

3GPP TSG RAN WG1 Meeting #80bis (R1-151719); Potential design for LAA UL transmission; Source: ZTE; Agenda Item 7.2.4.2; Belgrade, Serbia; Apr. 20-24, 2015.

* cited by examiner

CONTENTION FREE PHYSICAL UPLINK SHARED CONTROL CHANNEL (PUSCH) TRANSMISSION USING LISTEN BEFORE TALK

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNBs, or eNBs) and Radio Network Controllers (RNCs), which communicates with the wireless device, known as a user equipment (UE). The downlink (DL) transmission can be a communication from the node (e.g., eNB) to the wireless device (e.g., UE), and the uplink (UL) transmission can be a communication from the wireless device to the node.

In LTE, data can be transmitted from the eNB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

The air latency for a 3GPP LTE communication can be on the order of tens of milliseconds, depending on the type of communication. This latency can be sufficient for voice communications and audio/visual communication. However, the latency of current 3GPP LTE systems may not be conducive for future 5G systems.

BRIEF DESCRIPTION OF THE DRAWINGS

Features and advantages of the disclosure can be apparent from the detailed description which follows, taken in conjunction with the accompanying drawings, which together illustrate, by way of example, features of the disclosure; and, wherein.

Figure 1:
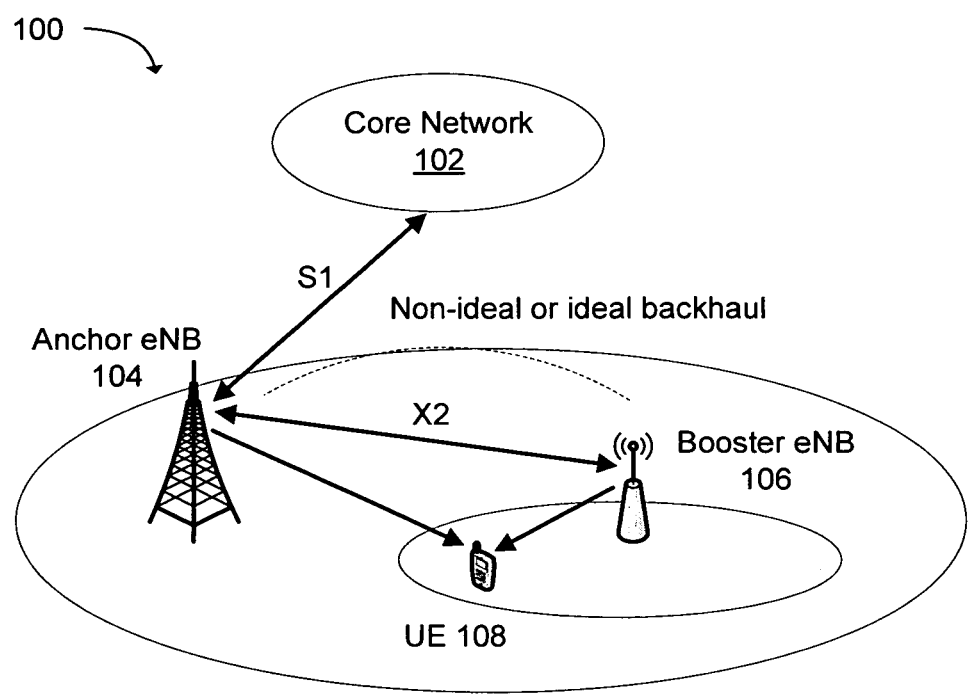
FIG. 1 illustrates a device to device (D2D) discovery zone within an LTE operation zone in accordance with an example.

Reference can now be made to the exemplary embodiments illustrated, and specific language can be used herein to describe the same. It can nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments are provided below and then specific technology embodiments are described in further detail later. This initial summary is intended to aid readers in understanding the technology more quickly but is not intended to identify key features or essential features of the technology nor is it intended to limit the scope of the claimed subject matter.

Reducing air interface latency for 3GPP radio access network (RAN) LTE systems is crucial for enabling new services and improving the performance of existing technology in advanced wireless communication systems. For example, reducing the round trip time (RTT) air interface latency target for upcoming 5G 3GPP radio access network (RAN) LTE systems to 1 ms (millisecond) can allow new services and improve performance of existing technology. An RTT of 1 ms is significantly below what can be currently supported by 3GPP LTE Rel. 12. As such, one option for reducing data plane latency to a value close to 5G 3GPP radio access network (RAN) LTE system constraints is to reduce the total time interval (TTI) of a transmission, which is currently 1 ms for 3GPP radio access network (RAN) LTE systems. However, the RTT data plane latency constraint does not guarantee to achieve an overall end-to-end latency reduction. Specifically, for an uplink transmission, the Control plane (C-plane) latency in the idle state dominates the total latency for small packet transmissions. When the UE is in an idle state, the UE does not have a radio resource control (RRC) connection. The C-plane latency can be measured as the time for the UE (User Equipment) to transit from an idle state to active state.

As such, the present technology provides a solution using a listen before talk (LBT) based physical uplink shared control channel (PUSCH) transmission, with the objective of reducing C-plane latency and providing a grant free PUSCH transmission.

In one aspect, the present technology provides a procedure for latency reduction and low latency communications in the uplink PUSCH transmission. In one aspect, low latency can be achieved by removing the scheduling grant constraint of current 3GPP radio access network (RAN) LTE system designs in 3GPP LTE Rel. 8, 9, 10, 11 or 12, while the PUSCH transmission is based on the carrier sensing. In one example, a frequency-division duplexing (FDD) configuration can be considered and used for the present technology. In other aspects, it should be noted that the present technology can be used in an RRC non-connected mode (i.e. idle) and/or a time-division duplexing (TDD) configuration. It can be assumed that UEs are time-frequency synchronized with an associated eNB.

In one aspect, the LBT based PUSCH transmission can be categorized as a contention based PUSCH transmission, wherein, each UE can sense the channel (or medium) for a specified duration before transmission on the allocated resources. If the channel is sensed idle, the wireless device (e.g., the UE) can be allowed to transmit only on the allocated resources, which are sensed as idle. As such, the present technology enables the UEs to directly transmit the data without any involvement from eNB (i.e. without an UL grant received from the eNB), thereby reducing the latency. It should be noted that reducing the collision probability can entail careful consideration particularly when two or more UEs do not transmit simultaneously, thereby reducing an error in the PUSCH transmission. In one example, in order for an eNB to determine from which UE the PUSCH transmission is sent, a UE identification (ID) can be contained in the PUSCH transmission or outside of the PUSCH transmission. The UE ID can be a cell radio network transmission identity (C-RNTI) or a new type of RNTI, and the RNTI can be encoded as part of an uplink (UL) shared channel (SCH) (UL-SCH) and/or can be masked on top of a cyclic redundancy check (CRC) for UL-SCH.

In one aspect, the technology provides for contention free physical uplink shared control channel (PUSCH) transmission using a listen before talk procedure. In one example, an apparatus of a user equipment (UE) can have circuitry comprising one or more processors configured to achieve low latency synchronization with an anchor enhanced Node (eNB) by sensing for a predetermined time period if any physical uplink shared channels (PUSCH) are idle with the anchor eNB for uplink (UL) synchronization, provide a unique UE identification in a PUSCH transmission, and/or communicate the PUSCH transmission in one of the idle PUSCH channels for contention free communication with the anchor eNB for uplink synchronization.

An additional technology is provided for contention free uplink (UL) synchronization between an anchored enhanced Node B (eNB) with a user equipment (UE). The anchor eNB having circuitry comprising one or more processors can receive a physical uplink shared channel (PUSCH) transmission for the UL synchronization from the UE following the UE sensing for a predetermined time period whether a PUSCH channel is idle with the anchor eNB. The eNB circuitry can further receive a unique UE identification in the PUSCH transmission and/or determine an identify of the UE by the unique UE identification in the PUSCH sub-Frame design for PUSCH transmission with LBT CH transmission for the contention free UL synchronization.

FIG. 1 illustrates an exemplary anchor-booster network architecture 100. The anchor-booster network architecture 100 is a form of a heterogeneous network. The anchor-booster network architecture 100 can include at least one anchor evolved node B (eNB) 104 and at least one booster eNB 106, such as a mm Wave small eNB or another type of low power (i.e. small) eNB. The anchor eNB 104 can be associated with an anchor cell, macro cell or primary cell. The booster eNB 106 can be associated with a booster cell, small cell or secondary cell. The booster eNB 106 can operate in the same or different frequency bands as the anchor eNB 104.

The anchor eNB 104 can be a high transmission power eNB for coverage and connectivity over a relatively large geographic area. For example, the anchor eNB may cover a cell with a radius of 1 to 10 or more kilometers. The anchor eNB 104 can be responsible for mobility of the UE because the coverage of the anchor eNB 104 is generally wider than that of the booster eNB 106. The anchor eNB 104 can also be responsible for communicating control information with the UE. In one embodiment, control information can be communicated using radio resource control (RRC) signaling.

The booster eNB 106 can be a low transmission power eNB for traffic offloading (i.e., offloading data transmissions) and quality of service (QoS) enhancement. For example, the booster eNB may cover a cell with a radius of tens of meters to hundreds of meters. The anchor eNB 104 and the booster eNB 106 can both serve packet data depending on the desired QoS. For example, the anchor eNB 104 can serve delay sensitive data, such as Voice over IP (VoIP), while the booster eNB 106 can serve delay tolerant data, such as data communicated using file transfer protocol (FTP) or other types of delay tolerant data.

A user equipment (UE) 108 can be supported by both the booster eNB 106 and the anchor eNB 104 in order to ensure mobility robustness, satisfy QoS performance and balance the traffic load between the anchor eNB 104 and the booster eNB 106. In other words, the UE 108 can support dual connectivity because the UE can be served by both the booster eNB 106 and the anchor eNB 104. With such dual connectivity, the anchor eNB 104 can handle control plane signaling and delay-sensitive traffic, while the booster eNB 106 can handle delay-tolerant data-plane traffic.

As shown in FIG. 1, the booster eNB 106 can be deployed under the coverage of the anchor eNB 104 and connected to the core network 102. The anchor eNB 104 and the booster eNB 106 can be connected via an X2 interface or another type of interface. The anchor eNB 104 and the core network 102 can be connected via an SI interface. The backhaul link connecting the anchor eNB 104 and the booster eNB 106 can be ideal or non-ideal, wherein an "ideal" backhaul link has a latency (in milliseconds) that is less than a predetermined value and a "non-ideal" backhaul link has a latency that is greater than the predetermined value. The predetermined value can be selected by a network operator based on the network architecture, geographic operating region, cell density, etc.

Each backhaul technology can be associated with a latency (one-way), throughput and priority level. For example, fiber access 1 can have a latency of 10-30 ms, fiber access 2 can have a latency of 5-10 ms, fiber access 3 can have a latency of 2-5 ms, digital subscriber line (DSL) access can have a latency of 10-60 ms, and wireless backhaul can have a latency of 5-35 ms. In one configuration, the latencies associated with fiber access 1, fiber access 2, fiber access 3, DSL access and wireless backhaul can be greater than the predetermined value, and therefore, are considered to be non-ideal backhauls. As another example, fiber can have a latency (one-way) that does not exceed 2.5 microseconds (μs). In one configuration, the latency associated with fiber can be less than the predetermined value, and therefore, can be considered to be an ideal backhaul.

The macro/anchor cell can function as an "umbrella" cell and the small/booster cells can be added to the UE as secondary cells. As described in further detail below, the small/booster cell can be added or removed to the UE via signaling between the UE, booster eNB and anchor eNB. Upon addition of the small/booster cell being coordinated between the anchor eNB and the booster eNB, a radio resource control (RRC) message (i.e., a control plane message) can be communicated to the UE to add the small/booster cell.

Figure 2:
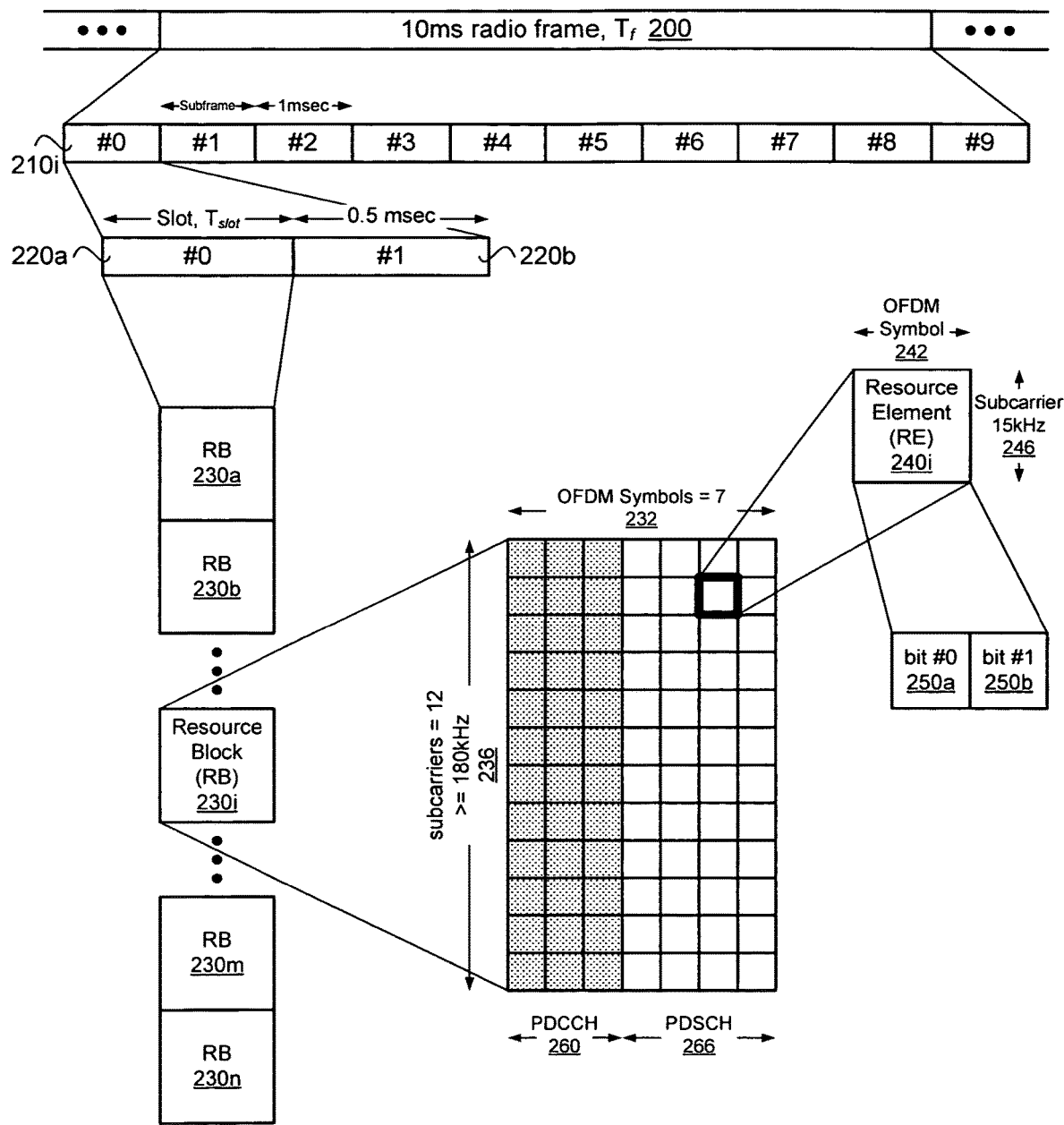
FIG. 2 illustrates a diagram of radio frame resources (e.g., a resource grid) for a downlink (DL) transmission including a legacy physical downlink control channel (PDCCH) in accordance with an example.

FIG. 2 illustrates a diagram of radio frame resources (e.g., a resource grid) for a downlink (DL) transmission including a legacy physical downlink control channel (PDCCH) in accordance with an example. In the example, a radio frame 200 of a signal used to transmit the data can be configured to have a duration, Tf, of 10 milliseconds (ms). Each radio frame can be segmented or divided into ten subframes 210i that are each 2 ms long. Each subframe can be further subdivided into two slots 220a and 220b, each with a duration, Tslot, of 0.5 ms. The first slot (#0) 220a can include a legacy physical downlink control channel (PDCCH) 260 and/or a physical downlink shared channel (PDSCH) 266, and the second slot (#1) 220b can include data transmitted using the PDSCH. It one aspect, at least part of the architectural design of the radio frame 200 can also be applicable for a single carrier frequency division multiple access (SC-FDMA) in an uplink (UL) transmission, as further described in FIG. 3.

Each slot for a component carrier (CC) used by the node and the wireless device can include multiple resource blocks (RBs) 230a, 230b, 230i, 230m, and 230n based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDCCH is used. The remaining 11 to 13 OFDM symbols (or 14 OFDM symbols, when legacy PDCCH is not used) in the subframe can be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

In one example embodiment, each RB (physical RB or PRB) 230i can include 12-15 kHz subcarriers 236 (on the frequency axis) and 6 or 7 orthogonal frequency-division multiplexing (OFDM) symbols 232 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 240i using short or normal cyclic prefixing, or the resource block can be mapped to 72 REs (not shown) using extended cyclic prefixing. The RE can be a unit of one OFDM symbol 242 by one subcarrier (i.e., 15 kHz) 246.

Each RE can transmit two bits 250a and 250b of information in the case of quadrature phase-shift keying (QPSK) modulation. Other types of modulation can be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNB to the UE, or the RB can be configured for an uplink transmission from the UE to the eNB.

The examples provided in FIG. 2 are not intended to be limiting. Other types of OFDM signaling and control information communication can be achieved using an anchor/booster communication scheme. When the booster eNB is a different type of RAT than the RAT used by the anchor eNB, the communication scheme illustrated in the example of FIG. 2 may or may not be used.

In one aspect, contention free uplink (UL) synchronization can be achieved by providing: 1) a sub-Frame design for PUSCH transmission with LBT; 2) a channel access mechanism for PUSCH transmission; 3) a preamble design for LBT based PUSCH transmission; and 4) optimizations for efficient PUSCH transmission.

For example, consider the following Control-plane latency breakdown for uplink (UL) PUSCH transmission in Table 1 for 3GPP Release 8. For PUSCH transmission, the total latency incurred in obtaining the scheduling grant from eNode is nearly 9.5 ms. The overhead is significant for any acceptable low latency design.

TABLE 1

Latency for synchronized UE

| Component | Description | Time (MS) |
|---|---|---|
| 1 | Average delay to send scheduling request (SR) opportunity (1 MS PUCCH cycle) | 0.5 |
| 2 | UE sends SR | 1 |
| 3 | eNB decodes the SR and generates the scheduling grant | 3 |
| 4 | Transmission of the scheduling grant | 1 |
| 5 | UE processing delay (decoding of scheduling grant and L1 encoding of UL data) | 3 |

TABLE 1-continued

Latency for synchronized UE

| Component | Description | Time (MS) |
|---|---|---|
| 7 | Transmission of UL data | 1 |
| | Total Delay | 9.5 |

As depicted in Table 2, having a latency for an asynchronized UE, the contention free (e.g., grant free) scheduling of the present technology for PUSCH transmission can be used based on carrier sensing and listen before talk. The latency for an unsynchronized UE can be reduced and the PRACH overhead (i.e., components 1, 2, 3, 4 in Table 2) can also be reduced.

TABLE 2

Latency for asynchronized UE

| Component | Description | Minimum Time (MS) | Avg. Time (MS) |
|---|---|---|---|
| 1 | Average delay to RACH scheduling period | 0.5 | 2.5 |
| 2 | RACH Preamble | 1 | 1 |
| 3 | Preamble detection and transmission of RA response (Time between the end of the RACH | 3 | 5 |
| 4 | UE processing delay (decoding of scheduling grant and L1 encoding of UL data) | 5 | 5 |
| 5 | Transmission of UL data | 1 | 1 |
| | Total Delay | 10.5 | 14.5 |

Figure 3:
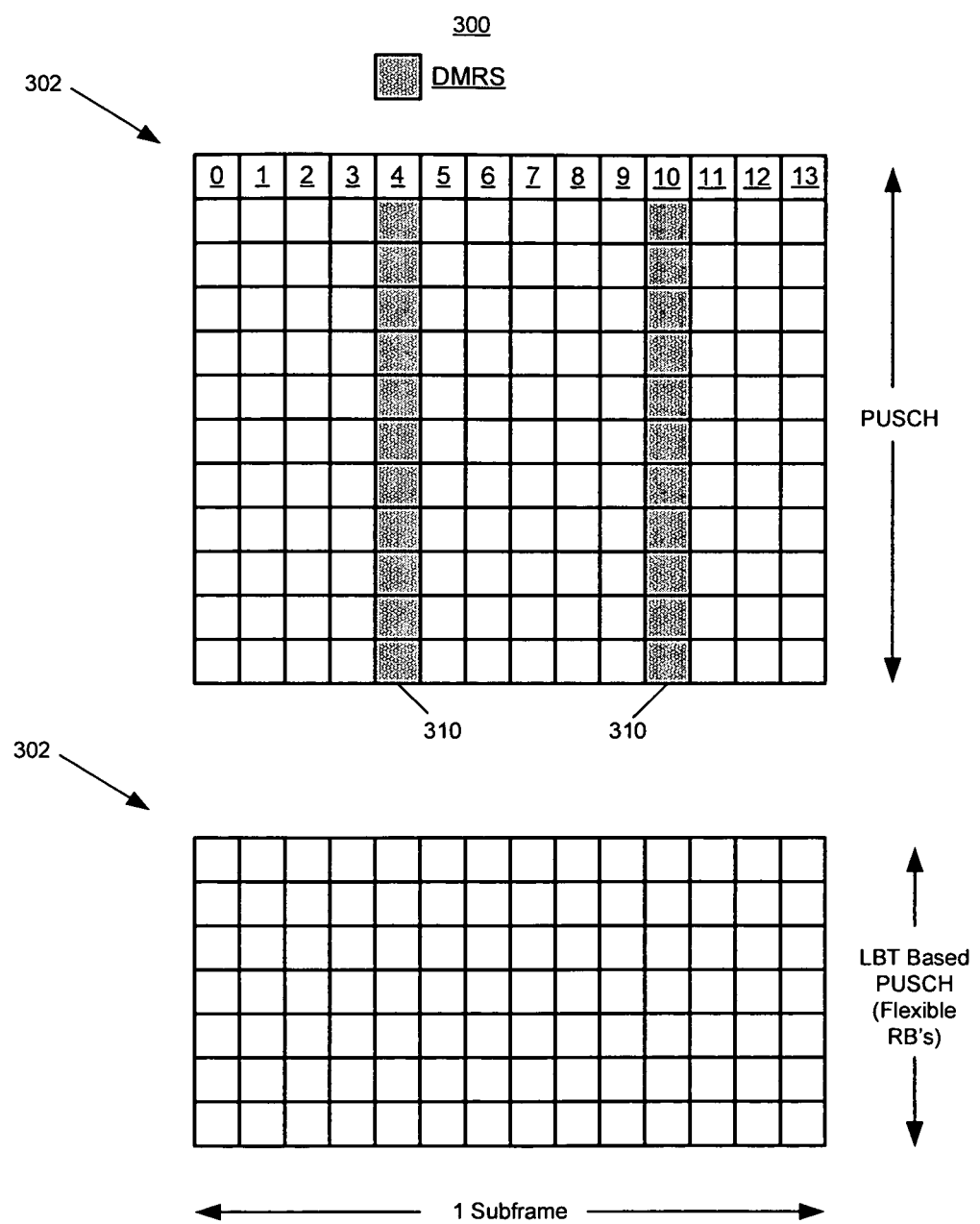
FIG. 3 illustrates a frame design of listen before talk (LBT) based physical uplink shared control channel (PUSCH) transmission in accordance with an embodiment of the present technology.

FIG. 3 illustrates a frame design of listen before talk (LBT) based physical uplink shared control channel (PUSCH) transmission 300 in accordance with an embodiment of the present technology. FIG. 3 describes an overall radio frame design of an LBT based PUSCH transmission 300. It should be noted that the descriptions and embodiments of FIG. 1 and FIG. 2 can be used in FIG. 3. That is, for example, the embodiments described in FIG. 3 can be applied to the frame structure in FIG. 2. The embodiments described in FIG. 3 can also be applied to different frame structures.

For example, in one aspect, at least part of the architectural design of the radio frame 200 in FIG. 2 can also be applicable for a single carrier frequency division multiple access (SC-FDMA) in an uplink (UL) transmission, as further described in FIG. 3. Hence, similar to FIG. 2, radio frame design of FIG. 3 can include a subframe that can includes two slots, such as slots 220a and 220 B of FIG. 2. A time for transmitting one subframe identification (ID) can be defined as a Transmission Time Interval (TTI). In the 3GPP LTE, one subframe may have a length of 1 ms and one slot may have a length of 0.5 ms. However, the structure of the radio frame and TTI can be varied according to a communication system. Communication systems with lower latency may have a significantly shorter TTI period.

One slot 302, similar to slot 220a and/or 220b of FIG. 2, can include a plurality of a Single Carrier-Frequency Division Multiple Access (SC-FDMA) symbols (e.g., 14 symbols such as 0 to 13 as shown the PUSCH transmission 602 in FIG. 3) in the time domain and includes a plurality of resource blocks in the frequency domain. For one resource block (RB 230) the horizontal axis thereof represents time axis and vertical axis thereof indicates frequency axis. In a Single Carrier-Frequency Division Multiple Access (SC-FDMA) system, a reference signal (RS) can use all frequency resources of one symbol in order to satisfy the single carrier property. In the 3GPP LTE system, an RS is not precoded on the uplink. The RS can be distinguished from data. Selected types of RS include a Demodulation RS (DMRS) 310 and a Sounding RS (SRS). The DMRS 310 can be a reference signal for acquiring channel information for demodulation of uplink data and the SRS can be a reference signal used for measurement of uplink channels.

As mentioned above, at least part of the architectural design of the radio frame 200 can also be applicable for a single carrier frequency division multiple access (SC-FDMA) in an uplink (UL) transmission, as further described in FIG. 3. That is, dedicated frequency-time resources can be used for LBT based PUSCH transmission, where the time/frequency resources (e.g., each demodulation reference signal "DMRS") can be configured by a higher layer signaling (e.g. RRC signaling).

In FIG. 3, at least a portion of the frequency resources can be used for a PUSCH transmission 300, as shown as the DMRS 310 in column 4 and column 10, while variable number of resource blocks (RB) can be used for LBT based PUSCH transmission 300. As depicted in FIG. 3, one or more DMRS 310 can be inserted into the PUSCH transmission 300. Due to the SC-FDMA transmission scheme, the DMRS 310 can occupy an entire OFDM symbol, such as in column 4 and column 10, within the PUSCH resource allocation. The length of a DMRS sequence can equal the number of subcarriers of an allocated resource block. A DMRS for a Physical Uplink Shared Channel (PUSCH) can be cyclic-shifted.

Information related to the time/frequency resources used in the PUSCH transmission can be conveyed to UEs by RRC signaling. Fixed a-priory resources known to all UEs can also be used, if desired, in addition to the variable resources. In case of non-connected RRC, it is possible that such fixed resources can be used for grant-free PUSCH transmission. In one aspect, the DMRS sequence can be generated using a Constant Amplitude Zero Autocorrelation Waveform (CAZAC) sequence. The CAZAC sequence can be a Zadoff-Chu (ZC) sequence, for example. Various ZC sequences can be generated according to a root index and a cyclic shift index. That is, a root index or cyclic shift index can be a seed value of the ZC sequence. DCI format 0, which provides control information for uplink data transmission, can include a cyclic shift index. Channels can be estimated from a plurality of terminals through an orthogonal (or quasi-orthogonal) sequence by allocating different cyclic shift indexes to the terminals.

Figure 4:
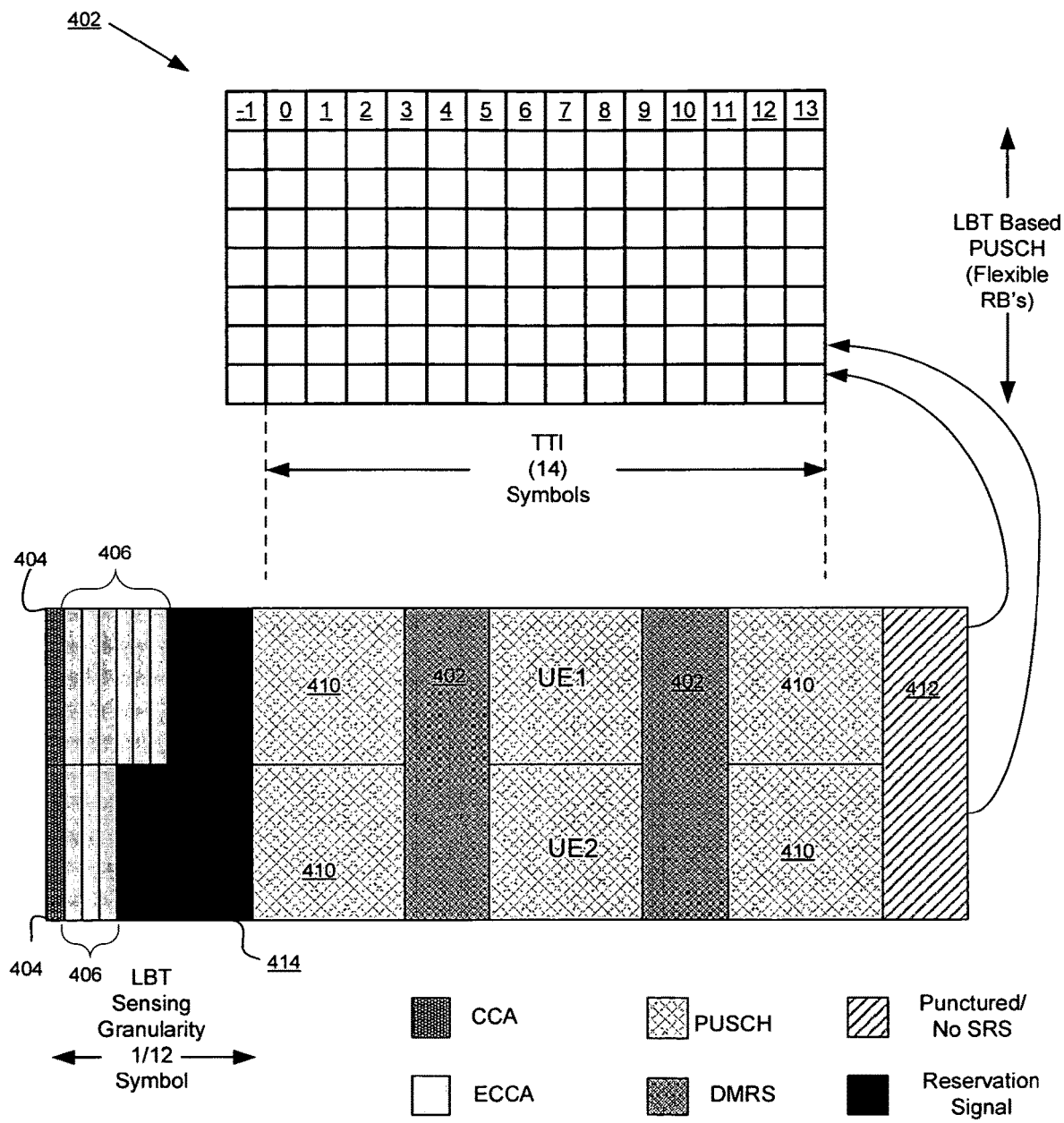
FIG. 4 illustrates a sub-frame design of listen before talk (LBT) based physical uplink shared control channel (PUSCH) transmission in accordance with an embodiment of the present technology.
Figure 5:
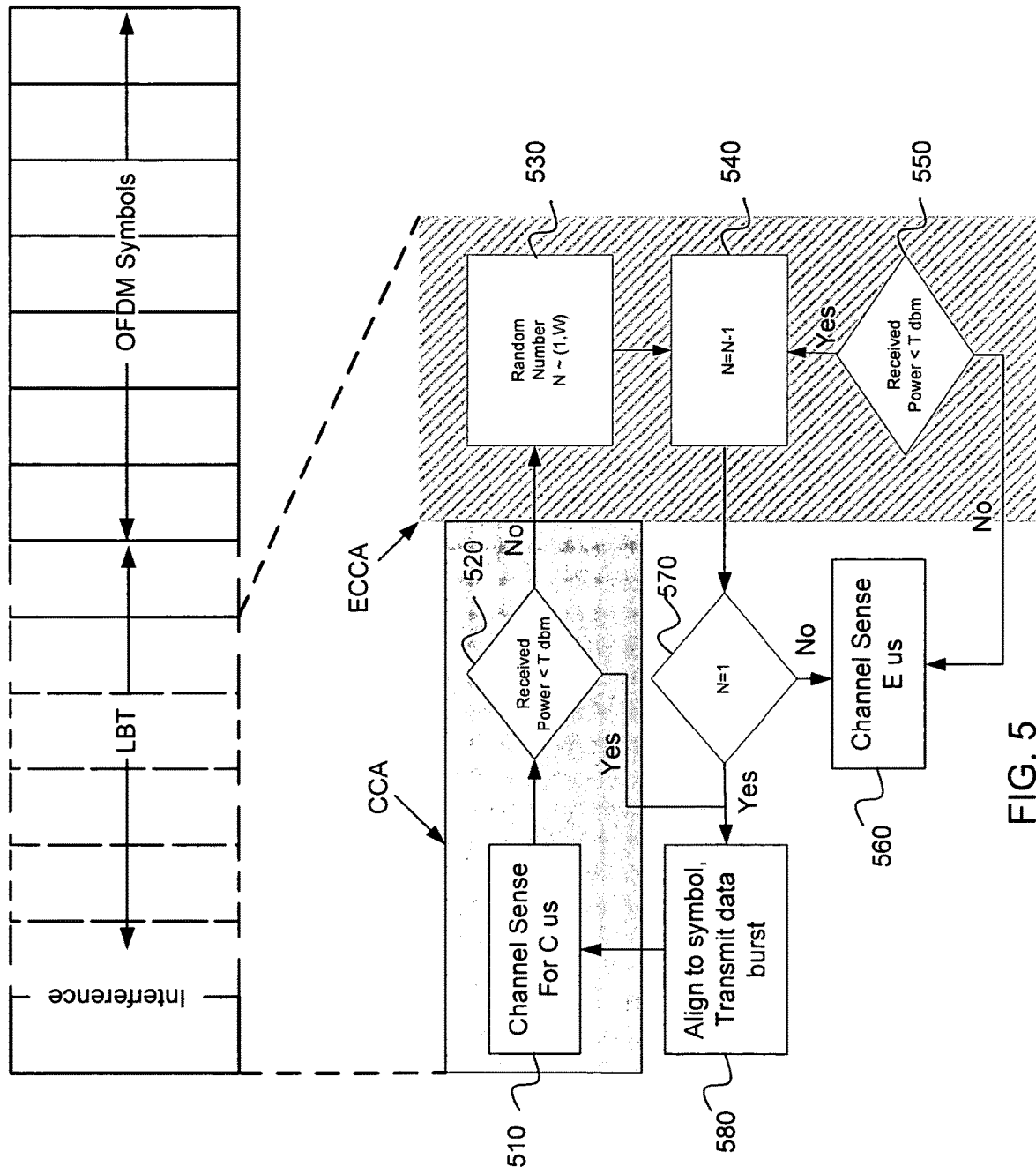
FIG. 5 illustrates a design of listen before talk (LBT) based physical uplink shared control channel (PUSCH) transmission with sub-frame level total time interval (TTI) in accordance with an embodiment of the present technology.

FIG. 4 illustrates a sub-frame design of listen before talk (LBT) based physical uplink shared control channel (PUSCH) transmission in accordance with an example. More specifically, FIG. 4 depicts a preliminary radio frame design of LBT based PUSCH uplink. FIG. 4 depicts two UE's, such as UE1 and UE2. Also, FIG. 4 depicts that the LBT operations can precede that of the PUSCH transmission. The LBT can consist of two phases as shown in FIGS. 4-5, including clear channel assessment (CCA) 404 and extended CCA (ECCA) 406. In FIG. 4, a DMRS 410, a PUSCH transmission 402, and reservation signal(s) 414 are also illustrated for both UE1 and UE2. During the CCA 404 and ECCA 406, a medium (e.g., a channel) can be sensed for idleness. The channel can be sensed as idle if the energy sensed during the CCA 404 and ECCA 406 duration is less than certain threshold. The duration for CCA 404 and ECCA 406 depends on a minimum sensing granularity.

In one aspect, the PUSCH transmission 402 can consist of up to 14 symbols (e.g., 0 to 13 as shown the PUSCH transmission 402 in FIG. 4. The reservation signal may start from the symbol in a subframe previous to the PUSCH transmission as shown in FIG. 4 referred as "−1", when SRS 412 is not transmitted or 13 symbols when one symbol is used for the SRS 412. Thus, for the LBT based PUSCH resources, no SRS 414 (e.g., depicted as "punctured/No SRS" in FIG. 4 for both UE1 and UE2) may be sent and PUSCH transmission 402 consisting of 13 symbols can be used for performing LBT in one empty symbol. A modulation and coding scheme (MCS) can be used for uplink transmission that can be known to the UE, such as UE1 and/or UE2, and an eNB. In one aspect, the lowest MCS can be used.

In other aspect, LBT can be performed starting at symbol 0 for a specified number of symbols M. Thus, PUSCH transmission can start from symbol M+1 and end at symbol 14 within the subframe. In this case, SRS can be transmitted on symbol 14 and no puncturing of symbol 14 is used.

In one aspect, control signals can be used to transmit C_RNTI of the UE (e.g., UE1 or UE2) after LBT completion of LBT, so an eNB can determine the identity of the UE (e.g., UE1 or UE2) or the eNB can perform a blind UE detection based on the sequence used for the DMRS 410 transmission with a single antenna.

LBT sensing granularity (slits) can be used as 1/12th of the symbol duration corresponding to 5.6 microseconds (us), corresponding to 12 subcarriers in the resource blocks. The CCA 404 can be performed for multiples of slits known to the UE (e.g., UE1 or UE2) by implementation or can be performed by signaling by an eNB. The ECCA 406 can span over multiple slits determined by a contention window (CW) known to the UE by implementation, or can be performed by signaling by an eNB. Each UE, such as UE1 or UE2, can determine the number of slits by generating a random number uniformly from (1, CW) referred as backoff counter. Each time the channel is sensed as idle, a ECCA counter can be reduced by 1. If the ECCA counter reaches to zero, the UE, such as UE1 and/or UE2, can send reservation signals, which may consist of random bits) to align to a symbol and/or start of the next symbol. If a UE, such as UE1 or UE2, is unable to obtain an empty channel, the LBT can be performed in the next sub-frame, using the current counter without generating the new random number. In one of the aspects, the counter can be regenerated for every transmission attempt. In one aspect, it is possible to skip the CCA 404 operation completely as a design choice. These operations are further described in FIG. 5.

FIG. 5 illustrates a design of listen before talk (LBT) based physical uplink shared control channel (PUSCH) transmission with sub-frame level total time interval (TTI) in accordance with an example. It should be noted that the descriptions and embodiments of FIGS. 1-4 can be used in FIG. 5. In action 510, during the CCA and ECCA, a channel medium in wireless communication can be sensed (e.g., using the LBT operation) for a first predetermined time period (e.g., "C" microseconds (us) or "C us") for idleness. In action 520, a determination can be made to determine if energy (e.g., received power) sensed during the CCA and ECCA duration is less than specified threshold ($T_{dbm}$). If the energy (e.g., received power) sensed during the CCA and ECCA duration is not less than specified threshold ($T_{dbm}$), each UE, such as UE1 or UE2, can determine the number of slits by generating a random number uniformly from (1, CW), as in action 530 and, as in action 540, each time the channel is sense idle, a ECCA counter can be reduced by 1, represented as N=N−1, where N is random number).

Moving to action 570 from action 560, a determination is made to check if the random number (N) is equal to one (1) (e.g., N=1). If no, the channel medium can be sensed for a second predetermined time period (e.g., "E" microseconds (us) or "E us") for idleness. Also, returning to action 520, if the energy (e.g., received power) sensed during the CCA and ECCA duration is less than specified threshold ($T_{dbm}$), a determination is made to check if the random number (N) is equal to one (1), as in action 570.

In one aspect, from either action 540 or action 550, in action 550, similar to action 520, a determination can be made once again to determine if energy (e.g., received power) sensed during the CCA and ECCA duration is less than specified threshold ($T_{dbm}$). If the energy (e.g., received power) sensed during the CCA and ECCA duration is not less than specified threshold ($T_{dbm}$), each UE can determine the number of slits by generating a random number uniformly from (1, CW). As observe in FIG. 5, if yes, the action 550 moves to and/or returns to action 540. If no, the action 550 moves to or returns to action 560.

If the random number (N) is equal to one (1), as in action 570, the action moves to action 580, and each UE, such as UE1 and/or UE2, can send reservation signals to align to a symbol and/or start of the next symbol. If a UE, such as UE1 or UE2, is unable to obtain an empty channel, action 580 returns to action 510, where the LBT can be performed in the next sub-frame, however, using the current counter, without generating the new random number.

Figure 6:
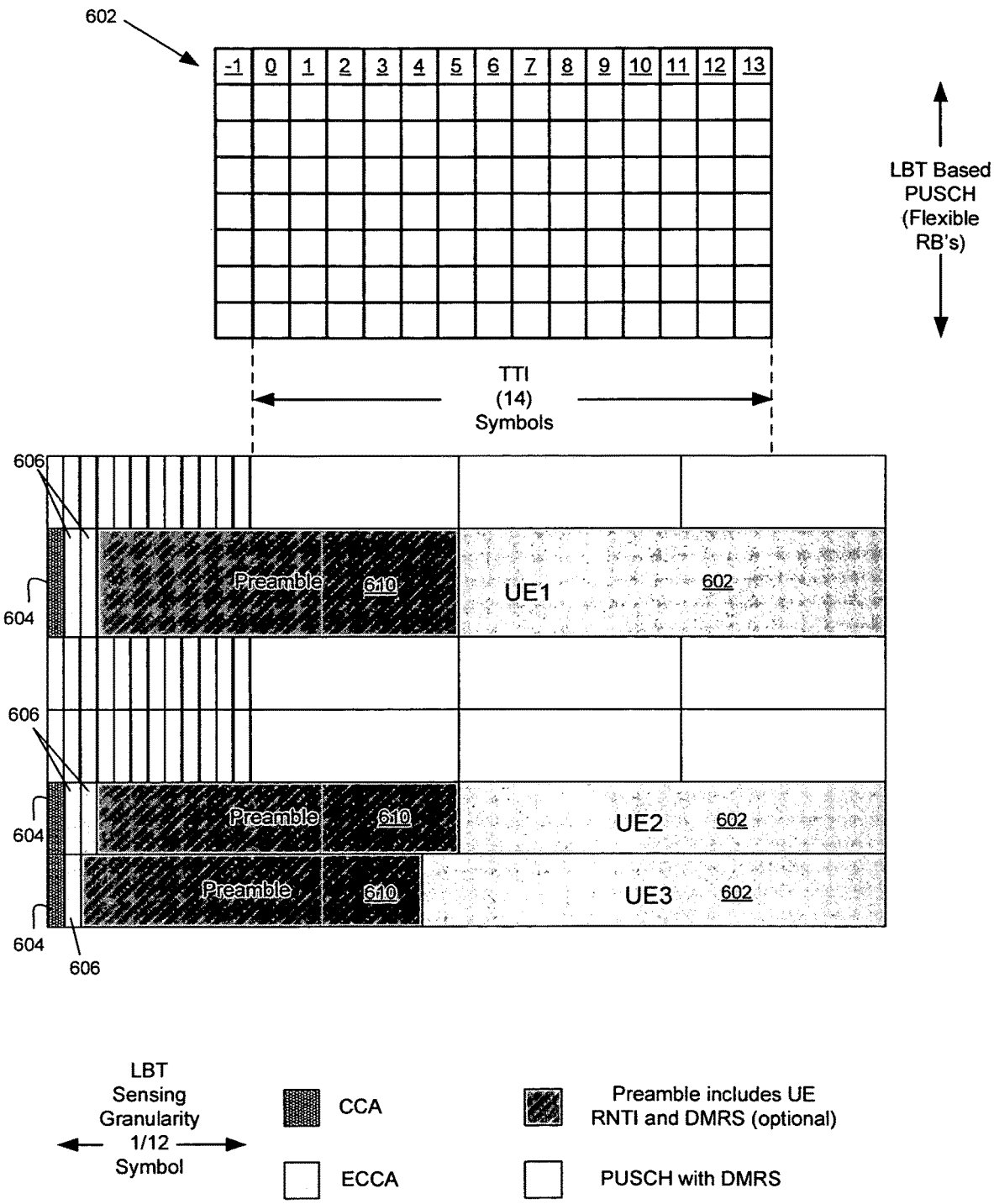
FIG. 6 illustrates a design of listen before talk (LBT) based physical uplink shared control channel (PUSCH) transmission with preamble signaling in accordance with an embodiment of the present technology.

FIG. 6 illustrates a design of listen before talk (LBT) based physical uplink shared control channel (PUSCH) transmission with preamble signaling in accordance with an example. FIG. 6 depicts additional options of the LBT based PUSCH transmission. Similar to FIG. 4, LBT sensing granularity (slits) can be used as 1/12th symbol corresponding to 5.6 microseconds (us), corresponding to 12 subcarriers in the resource blocks. Also, during the CCA 604 and ECCA 606, a channel medium in wireless communication can be sensed (e.g., using the LBT operation) for a predetermined time period. The CCA 604 can be performed for multiple of slits known to the UE (e.g., UE1, UE2, and or UE3) by implementation or can be performed by signaling by an eNB.

In one aspect, the PUSCH transmission 602 can consist of up to 14 symbols (e.g., 0 to 13 as shown the PUSCH transmission 602 in FIG. 6). In one aspect, the TTI can be maintained to be 1 sub frame. However, as illustrated in FIG. 6, reducing the granularity to a symbol level can be achieved where the LBT operation can be performed within each symbol, as compared to performing the LBT operation in the last symbol as depicted in FIG. 3). As such, FIG. 6 includes a new additional Preamble signaling. A preamble 610 can include the UE RNTI and/or DMRS like signals for demodulation. Also, the DMRS can be removed in a PUSCH transmission burst. A modulation and coding scheme (MCS) can be used for uplink transmission that can be known to the UE, such as UE1, UE2, and/or UE3, and an eNB. The preamble can be used for a length of transmission (in number of symbols or TTI), and a cell identification (ID) (e.g. so as to ignore other cells during LBT), and also for scheduling a request and/or buffer status report (BSR) in case there is more data to transmit.

It should be noted that in one aspect the PUSCH transmission can be retransmitted. First, the PUSCH transmission can be received in error at an eNB. The retransmission can happen based on the PHICH information. An additional scheduling may also be sent with dedicated resources, where the failed PUSCH transmission may not follow LBT protocol for the retransmission. The repeat request (hybrid-ARQ) indicator channel (PHICH) function can be replaced by sending an UL grant that contains a new data indicator (NDI) and toggling information, which indicates whether to flush or not to flush a UL buffer.

In one aspect, as a synchronous operation, if the PHICH indicates an acknowledgement (ACK), the UE can be restricted from sending a retransmitted PUSCH transmission. If the PHICH indicates a negative acknowledgment (NACK), a UE can send a retransmitted PUSCH, such as in a determined time location (e.g. retransmission in TTI n+4 with reception of PHICH at TTI n, for frequency-division duplexing (FDD), which retransmission can be done with or without LBT protocol, where "n" is the subframe. As a synchronous or asynchronous HARQ operation, if the NDI in the UL grant is toggled, a UE can be restricted from sending the retransmitted PUSCH and can flush the UL data buffer. If the NDI in the UL grant is not toggled, the UE can send the retransmitted PUSCH in the time domain and/or frequency domain location given by UL grant. In particular, the time domain location can be implicitly defined, as in 3GPP LTE Rel. 8-12, such as in subframe n+4 with UL grant reception in subframe n. This retransmission can be done with or without LBT protocol.

In one aspect, each of the two PHICH and UL grant based HARQ operations can be considered together. For instance, when a UE expects and receives a PHICH based operation, but the UE also receives NDI in the UL grant, the UE may ignore the PHICH indication and may follow the NDI in the UL grant. In other words, the NDI can override the PHICH.

Figure 7:
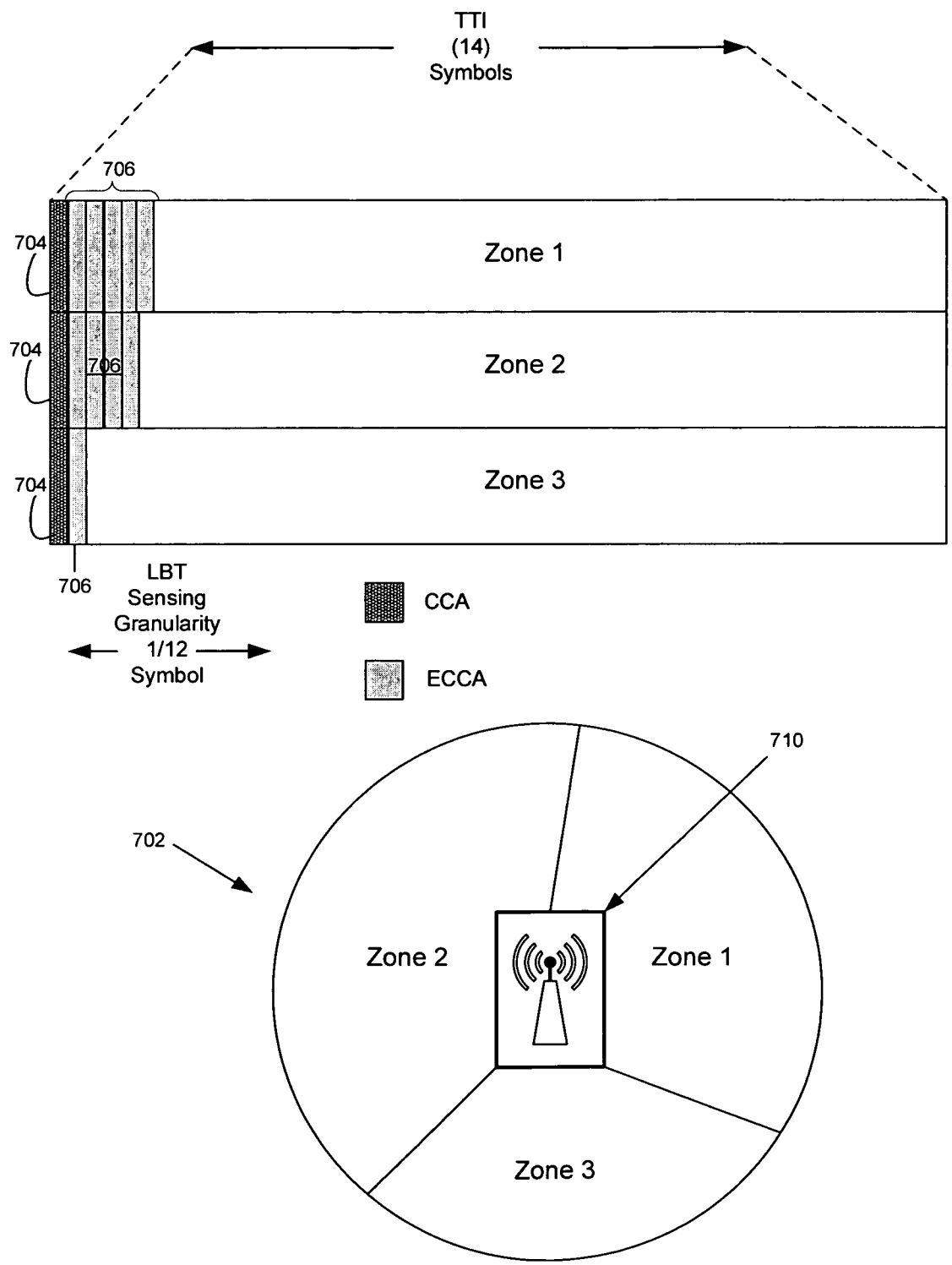
FIG. 7 illustrates a design of listen before talk (LBT) based physical uplink shared control channel (PUSCH) transmission win a LTB contention zone in accordance with an embodiment of the present technology.

FIG. 7 illustrates a design of listen before talk (LBT) based physical uplink shared control channel (PUSCH) transmission in LBT contention zones 702 in accordance with an example. It should be note that a hidden node issue can arise if multiple UEs transmit at the same time after performing LBT and the PUSCH transmissions are not successfully decoded at an eNB 710 due to high interference. The collision at the eNB 710 can occur if random number counters used for ECCA using the contention windows of different UEs are similar for each of the different UEs. As such, FIG. 7 depicts the use of adaptive splitting of UEs, wherein, each of the UEs belonging to different contention zones 702, such as Zone 1, Zone 2, and/or Zone 3, with each of the zones belong to different contention windows. Similar to FIG. 4, the LBT sensing granularity (slits) can be used as 1/12th symbol corresponding to 5.6 microseconds (us), corresponding to 12 subcarriers in the resource blocks. Also, during the CCA and ECCA, a channel medium in wireless communication can be sensed (e.g., using the LBT operation) for a predetermined time period.

In one aspect, each of the contention zones, such as Zone 1, Zone 2, and/or Zone 3, can be assigned a semi-static priority for contention windows based on the latency constraints. If a cell determines a collision, then an eNB can semi statically change (or increase) the contention window by creating a new zone or reduce the contention zones for successful transmissions.

Figure 8:
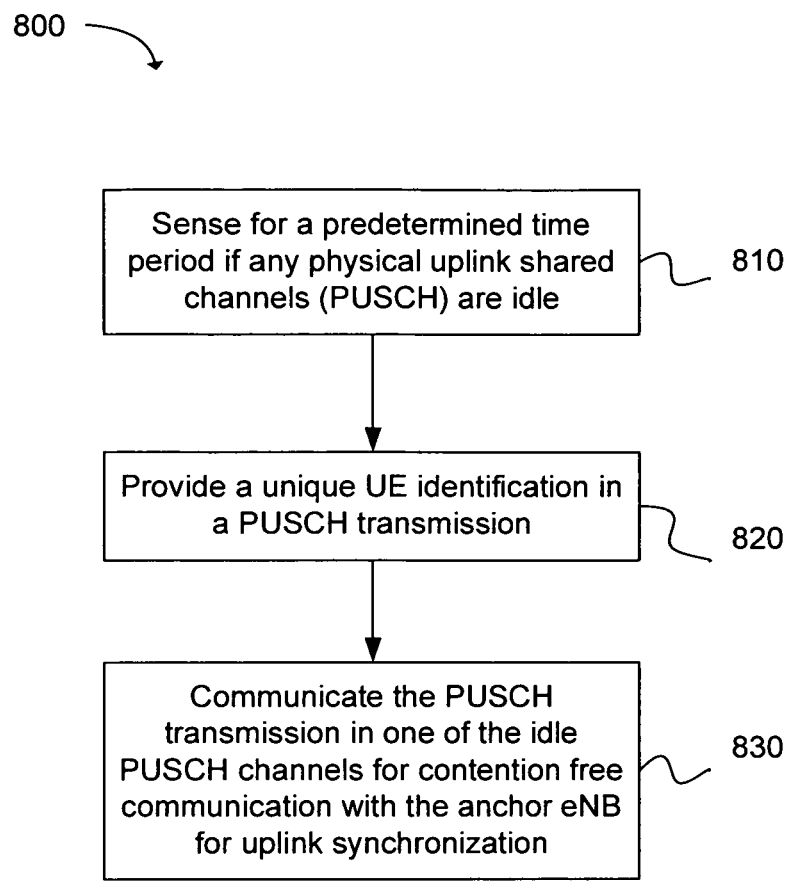
FIG. 8 depicts a flow chart of a method for achieving low latency between a user equipment (UE) and an anchor enhanced Node B (eNB) in accordance with an embodiment of the present technology.

FIG. 8 depicts a flow chart of a method for achieving low latency synchronization between a user equipment (UE) and an anchor enhanced Node B (eNB) in accordance with an example. For example, the functionality of the UE can be implemented as the method 800 or the functionality can be executed as instructions on a machine, where the instructions are included on at least one computer readable medium or one non-transitory machine readable storage medium. The one or more processors can be configured to sense for a predetermined time period if any physical uplink shared channels (PUSCH) are idle, as in block 810. The one or more processors can be configured to provide a unique UE identification a PUSCH transmission, as in block 820. The PUSCH transmission can be communicated in one of the idle PUSCH channels for a contention free (e.g., grant free) communication with the eNB for the uplink synchronization, as in action 830.

It should be noted that each of the following may be included in FIG. 8. In other words, each of the following may be included in each of the actions and/or in conjunction with one or more of the actions described in FIG. 8. The one or more processors can be configured to communicate the PUSCH transmission in one of the idle PUSCH channels with the anchor eNB without uplink synchronization scheduling. The one or more processors can be configured to sense a PUSCH channel is idle if a sensed energy is below a predefined threshold. The one or more processors can be configured to sense if any of the PUSCH channels are idle during a clear channel assessment (CCA) and an extended CCA (ECCA), wherein a duration of the CCA or ECCA is based upon minimum sensing granularity. The one or more processors can be configured to sense a PUSCH channel is idle if a sensed energy is below a predefined threshold during the duration of the CCA or ECCA.

In one aspect, the ECCA can span over a plurality of sensing granularity slits, wherein a number of the plurality of sensing granularity slits that the ECCA spans over is determined by a contention window.

In one aspect, the one or more processors can be configured to determine a number of the plurality of sensing granularity slits by generating a random number from 1 to the number of the plurality of sensing granularity slits that the ECCA spans over determined by the contention window, reduce the number of the plurality of sensing granularity slits that the ECCA spans over each time the PUSCH channel is sensed as idle, and/or reserve one of the PUSCH channels that is idle for communicating the PUSCH transmission.

In one aspect, the unique UE identification can be one a cell radio network temporary identifier (C-RNTI) and/or a radio network temporary identifier (RNTI). Moreover, communicating the PUSCH transmission can also be performed upon arrival of an UL packet at a media access control (MAC) buffer of the UE. The PUSCH transmission can consist of a plurality of symbols corresponding to subcarriers in a resource block, and the one or more processors can be configured to use at least one of the plurality of symbols for sensing the PUSCH channel is idle while using a remaining number of the plurality of symbols for the PUSCH transmission.

In one aspect, the one or more processors can be configured to use Modulation Coding Scheme (MCS) for the UL transmission, wherein the MCS can be predefined by a lowest MCS. In one aspect, the one or more processors can be configured to use preamble signaling for sensing the PUSCH channels are idle.

In an additional aspect, the one or more processors can be configured to communicate the PUSCH transmission in a hybrid automatic repeat request (HARQ) operation, process, for retransmission, the PUSCH transmission upon the UE receiving a negative acknowledgment (NACK) in a physical HARQ indicator channel (PHICH). The retransmission of the PUSCH transmission can be based on UL grant or based on a new data indicator (NDI) toggling in the UL grant. In one aspect, the one or more processors can be configured to communicate the PUSCH transmission in a configured time or frequency region, and/or adaptively split the UE from an alternative UE into different contention zones having different contention windows, wherein each of the contention zones are dynamically or semi-statically adapted according to latency constraints.

Figure 9:
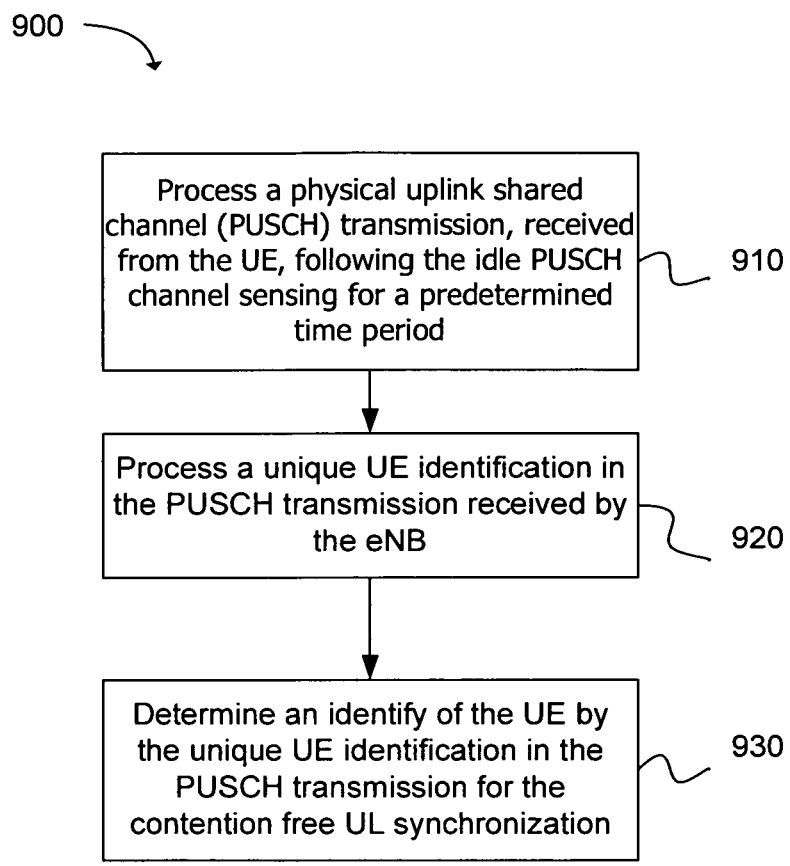
FIG. 9 depicts a flow chart of an additional method for achieving contention free uplink (UL) synchronization between an anchored enhanced Node B (eNB) with a user equipment (UE) in accordance with an embodiment of the present technology.

FIG. 9 depicts a flow chart of an additional method for achieving contention free uplink (UL) synchronization between an anchored enhanced Node B (eNB) with a user equipment (UE) in accordance with an example. For example, the functionality of the eNB can be implemented as the method 900 or the functionality can be executed as instructions on a machine, where the instructions are included on at least one computer readable medium or one non-transitory machine readable storage medium. The one or more processors can be configured to process a physical uplink shared channel (PUSCH) transmission, received from the UE, following the idle PUSCH channel sensing for a predetermined time period, as in block 910. The one or more processors can be configured to receive a unique UE identification (ID) in a PUSCH transmission by an ENodeB, as in block 920. The identify of the UE can be determined by the UE unique ID in the PUSCH transmission for a contention free (e.g., grant free) communication with the eNB for the uplink synchronization, as in action 930. In one aspect, FIG. 9 can also perform a blind UE detection based on demodulation reference signal (DMRS).

It should be noted that each of the following may be included in FIG. 9. In other words, each of the following may be included in each of the actions and/or in conjunction with one or more of the actions described in FIG. 9.

In one aspect, the one or more processors can be configured to perform a blind UE detection based on demodulation reference signal (DMRS), process the PUSCH transmission that is received in one of the idle PUSCH channels from the UE without UL synchronization scheduling, process a reserve signal, that is received from the UE, for reserving one of a plurality of PUSCH channels that is idle for receiving the PUSCH transmission, and/or process the PUSCH transmission, received from the UE, upon arrival of an UL packet at a media access control (MAC) buffer of the UE.

In one aspect, the one or more processors can be configured to use Modulation Coding Scheme (MCS) for the UL transmission, wherein the MCS can be predefined by a lowest MCS.

In one aspect, the one or more processors can be configured to received the PUSCH transmission in a hybrid automatic repeat request (HARQ) operation, process, for transmission, a negative acknowledgment (NACK) in a physical HARQ indicator channel to the UE to trigger the UE to retransmit the PUSCH transmission, process, for transmission, an UL grant or a new data indicator (NDI) toggling in the UL grant to the UE for the retransmission of the PUSCH transmission, and/or process the PUSCH transmission received in a configured time or frequency region.

In one aspect, the one or more processors can be configured to dynamically or semi-statically adapt and/or assign a contention window upon determining a cell collision between the UE and an alternative UE by creating a new contention zone having a different contention window or reducing a currently used contention zone for successfully receiving the PUSCH transmission.

Figure 10:
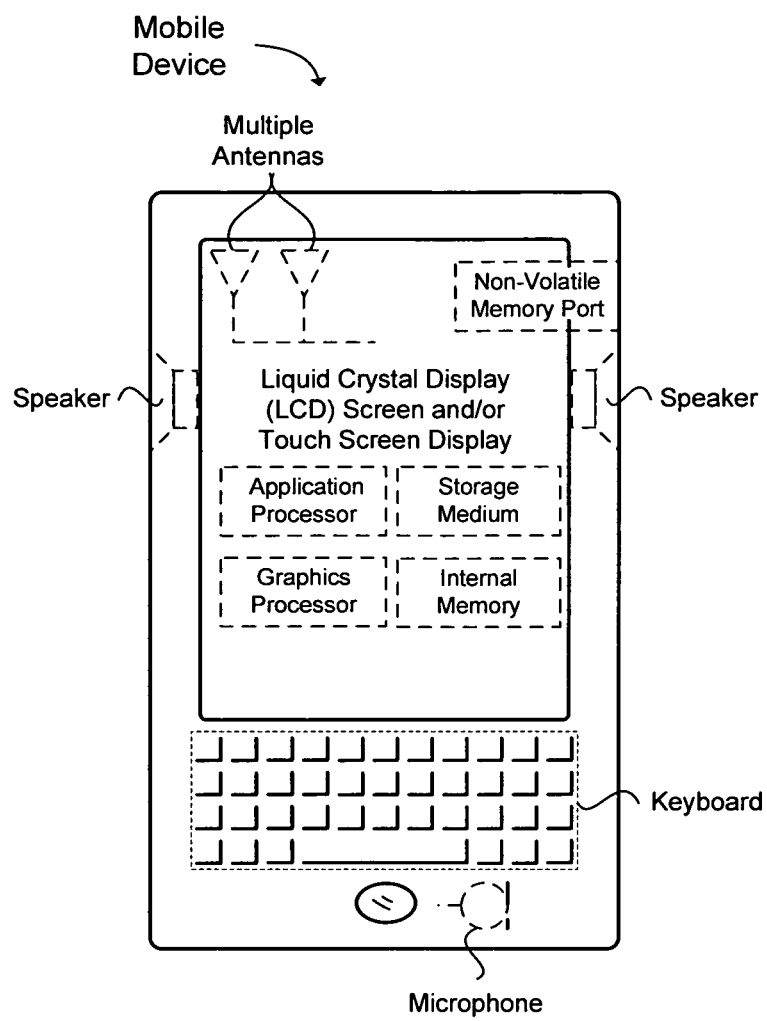
FIG. 10 illustrates a diagram of a wireless device (e.g., UE) in accordance with an example.

FIG. 10 provides an example illustration of the wireless device 1000, such as a user equipment (UE), a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Aspects described herein can be implemented into a system using any suitably configured hardware and/or software.

Figure 11:
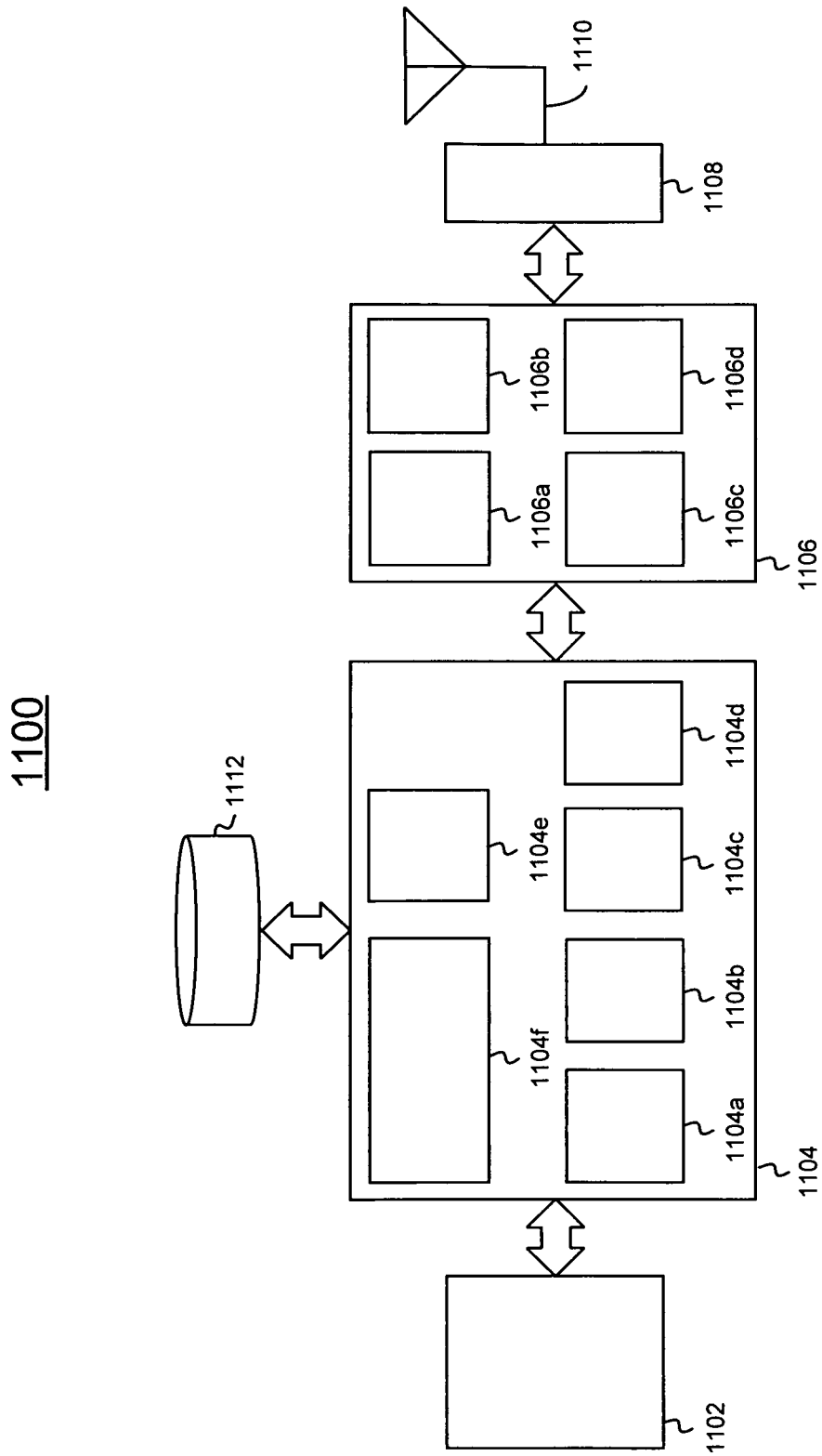
FIG. 11 illustrates a diagram of example components of a wireless device (e.g. User Equipment "UE") device in accordance with an example.

FIG. 11 illustrates, for one aspect, example components of a User Equipment (UE) device 1100. In some aspects, the UE device 1100 can include application circuitry 1102, baseband circuitry 1004, Radio Frequency (RF) circuitry 1106, front-end module (FEM) circuitry 1008 and one or more antennas 1110, coupled together at least as shown.

The application circuitry 1102 can include one or more application processors. For example, the application circuitry 1002 can include circuitry such as, but not limited to, one or more single-core or multi-core processors. The processor(s) can include any combination of general-purpose processors and dedicated processors (e.g., graphics processors, application processors, etc.). The processor(s) can include any combination of general-purpose processors and dedicated processors (e.g., graphics processors, application processors, etc.). The processors can be coupled with and/or can include a storage medium 1112, and can be configured to execute instructions stored in the storage medium 1112 to enable various applications and/or operating systems to run on the system.

The baseband circuitry 1104 can include circuitry such as, but not limited to, one or more single-core or multi-core processors. The baseband circuitry 1104 can include one or more baseband processors and/or control logic to process baseband signals received from a receive signal path of the RF circuitry 1106 and to generate baseband signals for a transmit signal path of the RF circuitry 1106. Baseband processing circuitry 1104 can interface with the application circuitry 1102 for generation and processing of the baseband signals and for controlling operations of the RF circuitry 1106. For example, in some aspects, the baseband circuitry 1104 can include a second generation (2G) baseband processor 1104a, third generation (3G) baseband processor 1104b, fourth generation (4G) baseband processor 1104c, and/or other baseband processor(s) 1104d for other existing generations, generations in development or to be developed in the future (e.g., fifth generation (5G), 6G, etc.). The baseband circuitry 1104 (e.g., one or more of baseband processors 1104a-d) can handle various radio control functions that enable communication with one or more radio networks via the RF circuitry 1106. The radio control functions can include, but are not limited to, signal modulation/demodulation, encoding/decoding, radio frequency shifting, etc. In some aspects, modulation/demodulation circuitry of the baseband circuitry 1104 can include Fast-Fourier Transform (FFT), precoding, and/or constellation mapping/demapping functionality. In some aspects, encoding/decoding circuitry of the baseband circuitry 1104 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1104 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1104e of the baseband circuitry 1104 can be configured to run elements of the protocol stack for signaling of the PHY, MAC, RLC, PDCP and/or RRC layers. In some aspects, the baseband circuitry can include one or more audio digital signal processor(s) (DSP) 1104f. The audio DSP(s) 1104f can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1104 and the application circuitry 1102 can be implemented together such as, for example, on a system on a chip (SOC).

In some aspects, the baseband circuitry 1104 can provide for communication compatible with one or more radio technologies. For example, in some aspects, the baseband circuitry 1104 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1104 is configured to support radio communications of more than one wireless protocol can be referred to as multi-mode baseband circuitry.

RF circuitry 1106 can enable communication with wireless networks using modulated electromagnetic radiation through a non-solid medium. In various aspects, the RF circuitry 1106 can include switches, filters, amplifiers, etc. to facilitate the communication with the wireless network. RF circuitry 1106 can include a receive signal path which can include circuitry to down-convert RF signals received from the FEM circuitry 1108 and provide baseband signals to the baseband circuitry 1104. RF circuitry 1106 can also include a transmit signal path which can include circuitry to up-convert baseband signals provided by the baseband circuitry 1104 and provide RF output signals to the FEM circuitry 1108 for transmission.

In some aspects, the RF circuitry 1106 can include a receive signal path and a transmit signal path. The receive signal path of the RF circuitry 1106 can include mixer circuitry 1106a, amplifier circuitry 1106b and filter circuitry 1106c. The transmit signal path of the RF circuitry 1106 can include filter circuitry 1106c and mixer circuitry 1106a. RF circuitry 1106 can also include synthesizer circuitry 1106d for synthesizing a frequency for use by the mixer circuitry 1106a of the receive signal path and the transmit signal path. In some aspects, the mixer circuitry 1106a of the receive signal path can be configured to down-convert RF signals received from the FEM circuitry 1108 based on the synthesized frequency provided by synthesizer circuitry 1106d. The amplifier circuitry 1106b can be configured to amplify the down-converted signals and the filter circuitry 1106c can be a low-pass filter (LPF) or band-pass filter (BPF) configured to remove unwanted signals from the down-converted signals to generate output baseband signals. Output baseband signals can be provided to the baseband circuitry 1104 for further processing. In some aspects, the output baseband signals can be zero-frequency baseband signals, although it does not have to be a zero-frequency baseband signal. In some aspects, mixer circuitry 1106a of the receive signal path can comprise passive mixers, although the scope of the aspects is not limited in this respect.

In some aspects, the mixer circuitry 1106a of the transmit signal path can be configured to up-convert input baseband signals based on the synthesized frequency provided by the synthesizer circuitry 1106d to generate RF output signals for the FEM circuitry 1108. The baseband signals can be provided by the baseband circuitry 1104 and can be filtered by filter circuitry 1106c. The filter circuitry 1106c can include a low-pass filter (LPF), although the scope of the aspects is not limited in this respect.

In some aspects, the mixer circuitry 1106a of the receive signal path and the mixer circuitry 1106a of the transmit signal path can include two or more mixers and can be arranged for quadrature downconversion and/or upconversion respectively. In some aspects, the mixer circuitry 1106a of the receive signal path and the mixer circuitry 1106a of the transmit signal path can include two or more mixers and can be arranged for image rejection (e.g., Hartley image rejection). In some aspects, the mixer circuitry 1106a of the receive signal path and the mixer circuitry 1106a can be arranged for direct downconversion and/or direct upconversion, respectively. In some aspects, the mixer circuitry 1106a of the receive signal path and the mixer circuitry 1106a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1106 can include analog-to-digital converter (ADC) and digital-to-analog converter (DAC) circuitry and the baseband circuitry 1104 can include a digital baseband interface to communicate with the RF circuitry 1106.

In some dual-mode embodiments, a separate radio IC circuitry can be provided for processing signals for each spectrum, although the scope of the embodiments is not limited in this respect.

In some embodiments, the synthesizer circuitry 1106d can be a fractional-N synthesizer or a fractional N/N+1 synthesizer, although the scope of the embodiments is not limited in this respect as other types of frequency synthesizers can be suitable. For example, synthesizer circuitry 1106d can be a delta-sigma synthesizer, a frequency multiplier, or a synthesizer comprising a phase-locked loop with a frequency divider.

The synthesizer circuitry 1106d can be configured to synthesise an output frequency for use by the mixer circuitry 1106a of the RF circuitry 1106 based on a frequency input and a divider control input. In some embodiments, the synthesizer circuitry 1106d can be a fractional NN+1 synthesizer.

In some embodiments, frequency input can be provided by a voltage controlled oscillator (VCO), although the frequency input does not have to be a VCO. Divider control input can be provided by either the baseband circuitry 1104 or the applications processor 1102 depending on the desired output frequency. In some embodiments, a divider control input (e.g., N) can be determined from a look-up table based on a channel indicated by the applications processor 1102.

Synthesizer circuitry 1106d of the RF circuitry 1106 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1106 can include an IQ/polar converter.

FEM circuitry 1108 can include a receive signal path which can include circuitry configured to operate on RF signals received from one or more antennas 1010, amplify the received signals and provide the amplified versions of the received signals to the RF circuitry 1106 for further processing. FEM circuitry 1108 can also include a transmit signal path which can include circuitry configured to amplify signals for transmission provided by the RF circuitry 1106 for transmission by one or more of the one or more antennas 1110.

In some embodiments, the FEM circuitry 1108 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1106). The transmit signal path of the FEM circuitry 1108 can include a power amplifier (PA) to amplify input RF signals (e.g., provided by RF circuitry 1106), and one or more filters to generate RF signals for subsequent transmission (e.g., by one or more of the one or more antennas 1110.

In some embodiments, the UE device 1100 can include additional elements such as, for example, memory/storage, display, camera, sensor, and/or input/output (I/O) interface.

Figure 12:
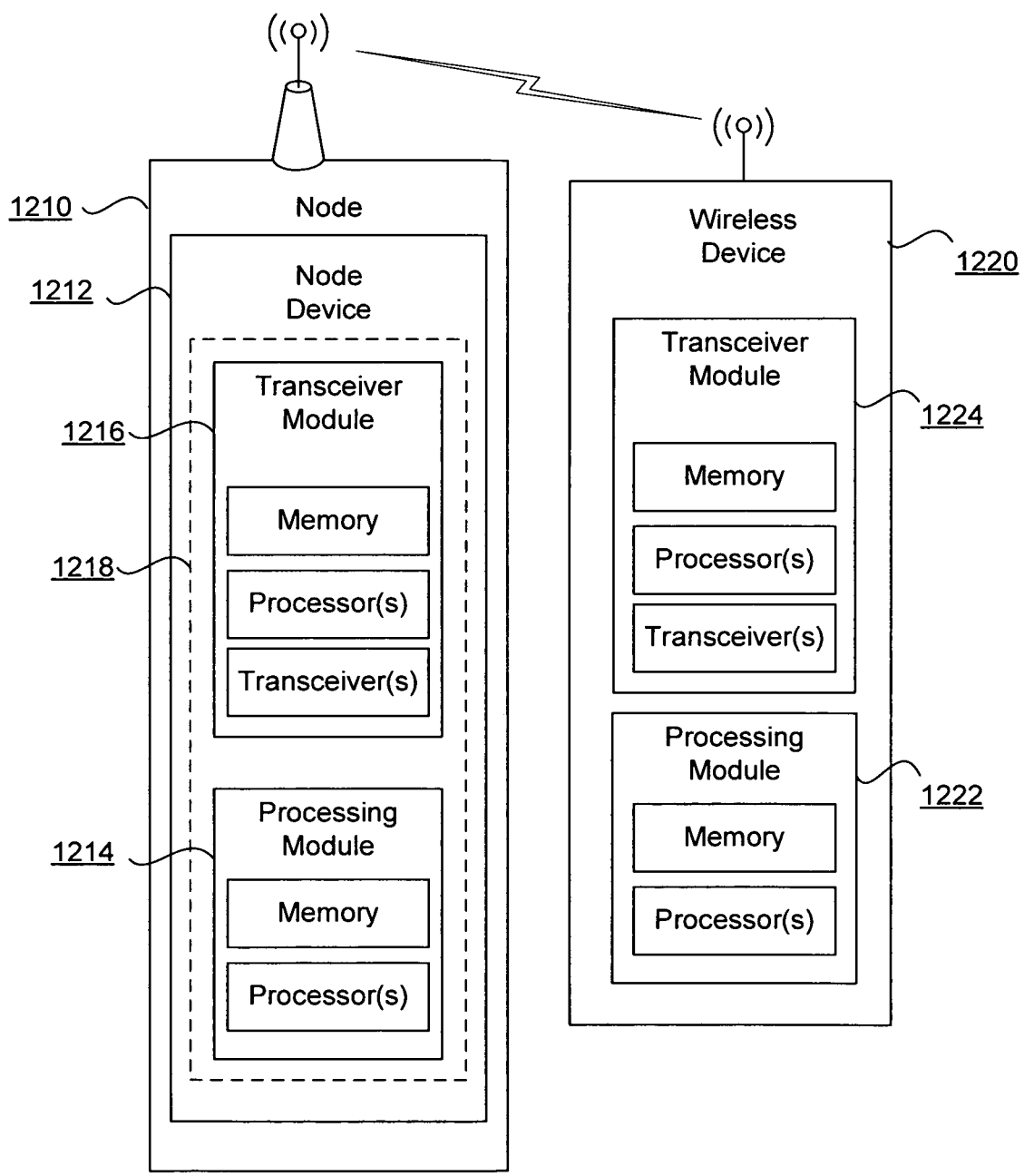
FIG. 12 illustrates a diagram of a node (e.g., eNB) and wireless device (e.g., UE) in accordance with an example.

FIG. 12 illustrates a diagram 1200 of a node 1210 (e.g., eNB and/or a Serving GPRS Support Node) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1210 can include a node device 1212. The node device 1212 or the node 1210 can be configured to communicate with the wireless device 1220. The node device 1212 can be configured to implement the technology described. The node device 1212 can include a processing module 1214 and a transceiver module 1216. In one aspect, the node device 1212 can include the transceiver module 1216 and the processing module 1214 forming a circuitry 1218 for the node 1210. In one aspect, the transceiver module 1216 and the processing module 1214 can form a circuitry of the node device 1212. The processing module 1214 can include one or more processors and memory. In one embodiment, the processing module 1222 can include one or more application processors. The transceiver module 1216 can include a transceiver and one or more processors and memory. In one embodiment, the transceiver module 1216 can include a baseband processor.

The wireless device 1220 can include a transceiver module 1224 and a processing module 1222. The processing module 1222 can include one or more processors and memory. In one embodiment, the processing module 1222 can include one or more application processors. The transceiver module 1224 can include a transceiver and one or more processors and memory. In one embodiment, the transceiver module 1224 can include a baseband processor. The wireless device 1220 can be configured to implement the technology described. The node 1210 and the wireless devices 1220 can also include one or more storage mediums, such as the transceiver module 1216, 1224 and/or the processing module 1214, 1222.

Examples

The following examples pertain to specific technology embodiments and point out specific features, elements, or steps that can be used or otherwise combined in achieving such embodiments.

Example 1 includes An apparatus of a user equipment (UE), the apparatus, under control of one or more processors and memory, to achieve low latency synchronization with an enhanced Node B (eNB), the apparatus configured to: sense for a predetermined time period if any physical uplink shared channels (PUSCH) are idle; provide a unique UE identification in a PUSCH transmission; and communicate the PUSCH transmission in one of the idle PUSCH channels for contention free communication with the eNB for uplink synchronization.

Example 2 includes the apparatus of example 1, wherein the apparatus is further configured to communicate the PUSCH transmission in one of the idle PUSCH channels with the eNB without uplink synchronization scheduling.

Example 3 includes the apparatus of example 1 or 2, wherein the apparatus is further configured to sense a PUSCH channel is idle if a sensed energy is below a predefined threshold.

Example 4 includes the apparatus of example 1, wherein the apparatus is further configured to perform a clear channel assessment (CCA) or extended clear channel assessment (ECCA) for multiples sensing granularity slits known to the UE or perform the CCA or the ECCA by signaling the eNB.

Example 5 includes the apparatus of example 1 or 4, wherein the apparatus is further configured to sense if any of the PUSCH channels are idle during a clear channel assessment (CCA) and an extended CCA (ECCA), wherein a duration of the CCA or ECCA is based upon minimum sensing granularity.

Example 6 includes the apparatus of example 1 or 5, wherein the apparatus is further configured to sense a PUSCH channel is idle if a sensed energy is below a predefined threshold during the duration of the CCA or the ECCA.

Example 7 includes the apparatus of example 1 or 5, wherein the apparatus is further configured to: perform the ECCA by spanning over a plurality of sensing granularity slits, wherein a number of the plurality of sensing granularity slits that the ECCA spans over is determined by a contention window (CW); determine a number of the plurality of sensing granularity slits by generating a random number from 1 to the number of the plurality of sensing granularity slits determined by the CW that the ECCA spans over determined as a backoff counter; and reduce the number of the plurality of sensing granularity slits that the ECCA spans over each time a PUSCH channel is sensed as idle.

Example 8 includes the apparatus of example 1 or 7, wherein the apparatus is further configured to: reduce an ECCA counter by a factor of one (1) each time the PUSCH channel is sensed as idle; send a reservation signal to align to the symbol boundary; or process, for transmission, the reservation signal to start a next symbol.

Example 9 includes the apparatus of example 8, wherein the apparatus is further configured to sense if a current transmission attempt is unsuccessful, wherein the UE continues to perform the ECCA in a subsequent subframe using a current counter of an ECCA counter without generating a new random number.

Example 10 includes the apparatus of example 1 or 9, wherein the apparatus is further configured to: sense if a current transmission attempt is unsuccessful, wherein the UE performs a listen before talk procedure consisting of the CCA and the ECCA by regenerating a new backoff counter in the next transmission attempt e.g. the subsequence subframe; and perform the listen before talk procedure starting at symbol 0 for a specified number of symbols M, wherein the PUSCH transmission starts from symbol M+1 and end at symbol 14 within the subframe, wherein M is a positive integer, wherein a sounding reference signal (SRS) is transmitted on the symbol 14, wherein puncturing of the symbol 14 is eliminated.

Example 11 includes the apparatus of example 1, wherein the apparatus is further configured to reserve one of the PUSCH channels that is idle for communicating the PUSCH transmission.

Example 12 includes the apparatus of example 1 or 11, wherein the unique UE identification is one of a cell radio network temporary identifier (C-RNTI) or a radio network temporary identifier (RNTI).

Example 13 includes the apparatus of example 1, wherein communicating the PUSCH transmission is performed upon arrival of an UL packet at a media access control (MAC) buffer of the UE.

Example 14 includes the apparatus of example 1 or 13, wherein the PUSCH transmission consists of a plurality of symbols corresponding to subcarriers in a resource block, wherein the circuitry is further configured to use at least one of the plurality of symbols for sensing the PUSCH channel is idle while using a remaining number of the plurality of symbols for the PUSCH transmission.

Example 15 includes the apparatus of example 1, wherein the apparatus is further configured to use Modulation Coding Scheme (MCS) for the UL transmission, wherein the MCS can be predefined by a lowest MCS.

Example 16 includes the apparatus of example 1 or 15, wherein the apparatus is further configured to use preamble signaling for sensing the PUSCH channels are idle.

Example 17 includes the apparatus of example 1, wherein the apparatus is further configured to use an additional preamble signal for sensing the PUSCH channels are idle, wherein the additional preamble signal includes a radio network temporary identifier (RNTI) or and a DMRS signal for demodulation, wherein the DMRS signal is removed during a PUSCH transmission burst.

Example 18 includes the apparatus of example 1 or 17, wherein the apparatus is further configured to communicate the PUSCH transmission in a hybrid automatic repeat request (HARQ) operation.

Example 19 includes the apparatus of example 18, wherein the apparatus is further configured to process, for retransmission, the PUSCH transmission upon the UE receiving a negative acknowledgment (NACK) in a physical HARQ indicator channel (PHICH).

Example 20 includes the apparatus of example or 19, wherein the retransmission of the PUSCH transmission is based on UL grant or based on a new data indicator (NDI) toggling in the UL grant.

Example 21 includes the apparatus of example 1, wherein the apparatus is further configured to communicate the PUSCH transmission in a configured time or frequency region.

Example 22 includes the apparatus of example 1 or 21, wherein the apparatus is further configured to adaptively split the UE from an alternative UE into different contention zones having different contention windows, wherein each of the contention zones are dynamically or semi-statically adapted according to latency constraints.

Example 23 includes the apparatus of example 1, wherein the apparatus includes at least one of an antenna, a touch sensitive display screen, a speaker, a microphone, a graphics processor, an application processor, a baseband processor, an internal memory, a non-volatile memory port, and combinations thereof.

Example 24 includes an apparatus of an anchored enhanced Node B (eNB) operable to achieve contention free uplink (UL) synchronization with a user equipment (UE), the apparatus configured to: process a physical uplink shared channel (PUSCH) transmission, received from the UE, following the idle PUSCH channel sensing for a predetermined time period; receive a unique UE identification in the PUSCH transmission; and determine an identify of the UE by the unique UE identification in the PUSCH transmission for the contention free UL synchronization.

Example 25 includes the apparatus of example 24, wherein the apparatus is further configured to perform a blind UE detection based on demodulation reference signal (DMRS).

Example 26 includes the apparatus of example 24 or 25, wherein the apparatus is further configured to generate a demodulation reference signal (DMRS) sequence using a Constant Amplitude Zero Autocorrelation Waveform (CAZAC) sequence, wherein the CAZAC sequence is a Zadoff-Chu (ZC) sequence.

Example 27 includes the apparatus of example 24, wherein the apparatus is further configured to process the PUSCH transmission that is received in one of the idle PUSCH channels from the UE without UL synchronization scheduling.

Example 28 includes the apparatus of example 24 or 27, wherein the apparatus is further configured to process a reserve signal that is received from the UE, for reserving one of a plurality of PUSCH channels that is idle for receiving the PUSCH transmission.

Example 29 includes the apparatus of example 24, wherein the apparatus is further configured to process the PUSCH transmission, received from the UE, upon arrival of an UL packet at a media access control (MAC) buffer of the UE.

Example 30 includes the apparatus of example 24 or 29, wherein the apparatus is further configured to: use Modulation Coding Scheme (MCS) for the UL transmission, wherein the MCS can be predefined by a lowest MCS; process the PUSCH transmission received in a hybrid automatic repeat request (HARQ) operation; and process, for transmission, a negative acknowledgment (NACK) in a physical HARQ indicator channel to the UE to trigger the UE to retransmit the PUSCH transmission.

Example 31 includes the apparatus of example 24 or 29, wherein the apparatus is further configured to: process, for transmission, an UL grant or a new data indicator (NDI) toggling in the UL grant to the UE for the retransmission of the PUSCH transmission; process the PUSCH transmission received in a configured time or frequency region; and dynamically or semi-statically adapt or assign a contention window upon determining a cell collision between the UE and an alternative UE by creating a new contention zone having a different contention window or reducing a currently used contention zone for successfully receiving the PUSCH transmission.

Example 32 includes an apparatus of a user equipment (UE), the apparatus, under control of one or more processors and memory, to achieve low latency synchronization with an enhanced Node B (eNB), the apparatus configured to: sense for a predetermined time period if any physical uplink shared channels (PUSCH) are idle; provide a unique UE identification in a PUSCH transmission; and communicate the PUSCH transmission in one of the idle PUSCH channels for contention free communication with the eNB for uplink synchronization.

Example 33 includes the apparatus of example 32, wherein the apparatus is further configured to communicate the PUSCH transmission in one of the idle PUSCH channels with the eNB without uplink synchronization scheduling.

Example 34 includes the apparatus of example 32, wherein the apparatus is further configured to sense a PUSCH channel is idle if a sensed energy is below a predefined threshold.

Example 35 includes the apparatus of example 32, wherein the apparatus is further configured to perform a clear channel assessment (CCA) or extended clear channel assessment (ECCA) for multiples sensing granularity slits known to the UE or perform the CCA or the ECCA by signaling the eNB.

Example 36 includes the apparatus of example 32, wherein the apparatus is further configured to sense if any of the PUSCH channels are idle during a clear channel assessment (CCA) and an extended CCA (ECCA), wherein a duration of the CCA or ECCA is based upon minimum sensing granularity.

Example 37 includes the apparatus of example 36, wherein the apparatus is further configured to sense a PUSCH channel is idle if a sensed energy is below a predefined threshold during the duration of the CCA or the ECCA.

Example 38 includes the apparatus of example 36, wherein the apparatus is further configured to: perform the ECCA by spanning over a plurality of sensing granularity slits, wherein a number of the plurality of sensing granularity slits that the ECCA spans over is determined by a contention window (CW); determine a number of the plurality of sensing granularity slits by generating a random number from 1 to the number of the plurality of sensing granularity slits determined by the CW that the ECCA spans over determined as a backoff counter; and reduce the number of the plurality of sensing granularity slits that the ECCA spans over each time a PUSCH channel is sensed as idle.

Example 39 includes the apparatus of example 38, wherein the apparatus is further configured to: reduce an ECCA counter by a factor of one (1) each time the PUSCH channel is sensed as idle; process, for transmission, a reservation signal to align to the symbol boundary; or process, for transmission, the reservation signal to start a next symbol.

Example 40 includes the apparatus of example 39, wherein the apparatus is further configured to sense if a current transmission attempt is unsuccessful, wherein the UE continues to perform the ECCA in a subsequent subframe using a current counter of an ECCA counter without generating a new random number.

Example 41 includes the apparatus of example 40, wherein the apparatus is further configured to: sense if a current transmission attempt is unsuccessful, wherein the UE performs a listen before talk procedure consisting of the CCA and the ECCA by regenerating a new backoff counter in the next transmission attempt e.g. the subsequence subframe; and perform the listen before talk procedure starting at symbol 0 for a specified number of symbols M, wherein the PUSCH transmission starts from symbol M+1 and end at symbol 14 within the subframe, wherein M is a positive integer, wherein a sounding reference signal (SRS) is transmitted on the symbol 14, wherein puncturing of the symbol 14 is eliminated.

Example 42 includes the apparatus of example 41, wherein the apparatus is further configured to reserve one of the PUSCH channels that is idle for communicating the PUSCH transmission.

Example 43 includes the apparatus of example 42, wherein the unique UE identification is one of a cell radio network temporary identifier (C-RNTI) or a radio network temporary identifier (RNTI).

Example 44 includes the apparatus of example 32, wherein communicating the PUSCH transmission is performed upon arrival of an UL packet at a media access control (MAC) buffer of the UE.

Example 45 includes the apparatus of example 32, wherein the PUSCH transmission consists of a plurality of symbols corresponding to subcarriers in a resource block, wherein the circuitry is further configured to use at least one of the plurality of symbols for sensing the PUSCH channel is idle while using a remaining number of the plurality of symbols for the PUSCH transmission.

Example 46 includes the apparatus of example 32, wherein the apparatus is further configured to use Modulation Coding Scheme (MCS) for the UL transmission, wherein the MCS can be predefined by a lowest MCS.

Example 47 includes the apparatus of example 32, wherein the apparatus is further configured to use preamble signaling for sensing the PUSCH channels are idle.

Example 48 includes the apparatus of example 32, wherein the apparatus is further configured to use an additional preamble signal for sensing the PUSCH channels are idle, wherein the additional preamble signal includes a radio network temporary identifier (RNTI) or and a DMRS signal for demodulation, wherein the DMRS signal is removed during a PUSCH transmission burst.

Example 49 includes the apparatus of example 48, wherein the apparatus is further configured to communicate the PUSCH transmission in a hybrid automatic repeat request (HARQ) operation.

Example 50 includes the apparatus of example 49, wherein the apparatus is further configured to process, for retransmission, the PUSCH transmission upon the UE receiving a negative acknowledgment (NACK) in a physical HARQ indicator channel (PHICH).

Example 51 includes the apparatus of example 32, wherein the retransmission of the PUSCH transmission is based on UL grant or based on a new data indicator (NDI) toggling in the UL grant.

Example 52 includes the apparatus of example 32, wherein the apparatus is further configured to communicate the PUSCH transmission in a configured time or frequency region.

Example 53 includes the apparatus of example 32, wherein the apparatus is further configured to adaptively split the UE from an alternative UE into different contention zones having different contention windows, wherein each of the contention zones are dynamically or semi-statically adapted according to latency constraints.

Example 54 includes the apparatus of example 32, wherein the apparatus includes at least one of an antenna, a touch sensitive display screen, a speaker, a microphone, a graphics processor, an application processor, a baseband processor, an internal memory, a non-volatile memory port, and combinations thereof.

Example 55 includes an apparatus of an anchored enhanced Node B (eNB) operable to achieve contention free uplink (UL) synchronization with a user equipment (UE), the apparatus configured to: process a physical uplink shared channel (PUSCH) transmission, received from the UE, following the idle PUSCH channel sensing for a predetermined time period; receive a unique UE identification in the PUSCH transmission; and determine an identify of the UE by the unique UE identification in the PUSCH transmission for the contention free UL synchronization.

Example 56 includes the apparatus of example 55, wherein the apparatus is further configured to perform a blind UE detection based on demodulation reference signal (DMRS).

Example 57 includes the apparatus of example 55, wherein the apparatus is further configured to generate a demodulation reference signal (DMRS) sequence using a Constant Amplitude Zero Autocorrelation Waveform (CAZAC) sequence, wherein the CAZAC sequence is a Zadoff-Chu (ZC) sequence.

Example 58 includes the apparatus of example 55, wherein the apparatus is further configured to process the PUSCH transmission that is received in one of the idle PUSCH channels from the UE without UL synchronization scheduling.

Example 59 includes the apparatus of example 55, wherein the apparatus is further configured to process a reserve signal, which is received from the UE, for reserving one of a plurality of PUSCH channels that is idle for receiving the PUSCH transmission.

Example 60 includes the apparatus of example 55, wherein the apparatus is further configured to process the PUSCH transmission, received from the UE, upon arrival of an UL packet at a media access control (MAC) buffer of the UE.

Example 61 includes the apparatus of example 55, wherein the apparatus is further configured to: use Modulation Coding Scheme (MCS) for the UL transmission, wherein the MCS can be predefined by a lowest MCS; process the PUSCH transmission received in a hybrid automatic repeat request (HARQ) operation; and process, for transmission, a negative acknowledgment (NACK) in a physical HARQ indicator channel to the UE to trigger the UE to retransmit the PUSCH transmission.

Example 62 includes the apparatus of example 55, wherein the apparatus is further configured to: process, for transmission, an UL grant or a new data indicator (NDI) toggling in the UL grant to the UE for the retransmission of the PUSCH transmission; process the PUSCH transmission received in a configured time or frequency region; and dynamically or semi-statically adapt or assign a contention window upon determining a cell collision between the UE and an alternative UE by creating a new contention zone having a different contention window or reducing a currently used contention zone for successfully receiving the PUSCH transmission.

Example 63 includes an apparatus of a user equipment (UE), the apparatus, under control of one or more processors and memory, to achieve low latency synchronization with an enhanced Node B (eNB), the apparatus configured to: sense for a predetermined time period if any physical uplink shared channels (PUSCH) are idle; provide a unique UE identification in a PUSCH transmission; and communicate the PUSCH transmission in one of the idle PUSCH channels for contention free communication with the eNB for uplink synchronization.

Example 64 includes the apparatus of example 63, wherein the apparatus is further configured to: communicate the PUSCH transmission in one of the idle PUSCH channels with the eNB without uplink synchronization scheduling; sense a PUSCH channel is idle if a sensed energy is below a predefined threshold; perform a clear channel assessment (CCA) or extended clear channel assessment (ECCA) for multiples sensing granularity slits known to the UE or perform the CCA or the ECCA by signaling the eNB; or sense if any of the PUSCH channels are idle during the CCA and an extended CCA (ECCA), wherein a duration of the CCA or ECCA is based upon minimum sensing granularity.

Example 65 includes the apparatus of example 63 or 64, wherein the apparatus is further configured to sense a PUSCH channel is idle if a sensed energy is below a predefined threshold during the duration of the CCA or the ECCA.

In Example 66, the subject matter of Example 63 or any of the Examples described herein may further include, wherein the apparatus is further configured to: perform the ECCA by spanning over a plurality of sensing granularity slits, wherein a number of the plurality of sensing granularity slits that the ECCA spans over is determined by a contention window (CW); determine a number of the plurality of sensing granularity slits by generating a random number from 1 to the number of the plurality of sensing granularity slits determined by the CW that the ECCA spans over determined as a backoff counter; or reduce the number of the plurality of sensing granularity slits that the ECCA spans over each time a PUSCH channel is sensed as idle.

In Example 67, the subject matter of Example 63 or any of the Examples described herein may further include, wherein the apparatus is further configured to: reduce an ECCA counter by a factor of one (1) each time the PUSCH channel is sensed as idle; process, for transmission, a reservation signal to align to the symbol boundary; or process, for transmission, the reservation signal to start a next symbol.

In Example 68, the subject matter of Example 63 or any of the Examples described herein may further include, wherein the apparatus is further configured to: sense if a current transmission attempt is unsuccessful, wherein the UE continues to perform the ECCA in a subsequent subframe using a current counter of an ECCA counter without generating a new random number; sense if the current transmission attempt is unsuccessful, wherein the UE performs a listen before talk procedure consisting of the CCA and the ECCA by regenerating a new backoff counter in the next transmission attempt e.g. the subsequence subframe; or perform the listen before talk procedure starting at symbol 0 for a specified number of symbols M, wherein the PUSCH transmission starts from symbol M+1 and end at symbol 14 within the subframe, wherein M is a positive integer, wherein a sounding reference signal (SRS) is transmitted on the symbol 14, wherein puncturing of the symbol 14 is eliminated.

In Example 69, the subject matter of Example 63 or any of the Examples described herein may further include, wherein the apparatus is further configured to reserve one of the PUSCH channels that is idle for communicating the PUSCH transmission wherein the unique UE identification is one of a cell radio network temporary identifier (C-RNTI) or a radio network temporary identifier (RNTI), wherein communicating the PUSCH transmission is performed upon arrival of an UL packet at a media access control (MAC) buffer of the UE, wherein the PUSCH transmission consists of a plurality of symbols corresponding to subcarriers in a resource block, wherein the circuitry is further configured to use at least one of the plurality of symbols for sensing the PUSCH channel is idle while using a remaining number of the plurality of symbols for the PUSCH transmission.

In Example 70, the subject matter of Example 63 or any of the Examples described herein may further include, wherein the apparatus is further configured to: use Modulation Coding Scheme (MCS) for the UL transmission, wherein the MCS can be predefined by a lowest MCS; use preamble signaling for sensing the PUSCH channels are idle; use an additional preamble signal for sensing the PUSCH channels are idle, wherein the additional preamble signal includes a radio network temporary identifier (RNTI) or and a DMRS signal for demodulation, wherein the DMRS signal is removed during a PUSCH transmission burst; or communicate the PUSCH transmission in a hybrid automatic repeat request (HARQ) operation.

In Example 71, the subject matter of Example 63 or any of the Examples described herein may further include, wherein the apparatus is further configured to: process, for retransmission, the PUSCH transmission upon the UE receiving a negative acknowledgment (NACK) in a physical HARQ indicator channel (PHICH), wherein the retransmission of the PUSCH transmission is based on UL grant or based on a new data indicator (NDI) toggling in the UL grant; communicate the PUSCH transmission in a configured time or frequency region; or adaptively split the UE from an alternative UE into different contention zones having different contention windows, wherein each of the contention zones are dynamically or semi-statically adapted according to latency constraints, wherein the apparatus includes at least one of an antenna, a touch sensitive display screen, a speaker, a microphone, a graphics processor, an application processor, a baseband processor, an internal memory, a non-volatile memory port, and combinations thereof.

Example 72 includes an apparatus of an anchored enhanced Node B (eNB) operable to achieve contention free uplink (UL) synchronization with a user equipment (UE), the apparatus configured to: process a physical uplink shared channel (PUSCH) transmission, received from the UE, following the idle PUSCH channel sensing for a predetermined time period; receive a unique UE identification in the PUSCH transmission; and determine an identify of the UE by the unique UE identification in the PUSCH transmission for the contention free UL synchronization.

Example 73 includes the apparatus of example 72, wherein the apparatus is further configured to perform a blind UE detection based on demodulation reference signal (DMRS).

Example 74 includes the apparatus of any of examples 72 or 73, wherein the apparatus is further configured to generate a demodulation reference signal (DMRS) sequence using a Constant Amplitude Zero Autocorrelation Waveform (CAZAC) sequence, wherein the CAZAC sequence is a Zadoff-Chu (ZC) sequence.

In Example 75, the subject matter of Example 72 or any of the Examples described herein may further include, wherein the apparatus is further configured to: process the PUSCH transmission that is received in one of the idle PUSCH channels from the UE without UL synchronization scheduling; or process a reserve signal, that is received from the UE, for reserving one of a plurality of PUSCH channels that is idle for receiving the PUSCH transmission.

In Example 76, the subject matter of Example 72 or any of the Examples described herein may further include, wherein the apparatus is further configured to process the PUSCH transmission, received from the UE, upon arrival of an UL packet at a media access control (MAC) buffer of the UE.

In Example 77, the subject matter of Example 72 or any of the Examples described herein may further include, wherein the apparatus is further configured to: use Modulation Coding Scheme (MCS) for the UL transmission, wherein the MCS can be predefined by a lowest MCS; process the PUSCH transmission received in a hybrid automatic repeat request (HARQ) operation; process, for transmission, a negative acknowledgment (NACK) in a physical HARQ indicator channel to the UE to trigger the UE to retransmit the PUSCH transmission; process, for transmission, an UL grant or a new data indicator (NDI) toggling in the UL grant to the UE for the retransmission of the PUSCH transmission; process the PUSCH transmission received in a configured time or frequency region; or dynamically or semi-statically adapt or assign a contention window upon determining a cell collision between the UE and an alternative UE by creating a new contention zone having a different contention window or reducing a currently used contention zone for successfully receiving the PUSCH transmission.

Example 78 includes a device to achieve low latency synchronization with an enhanced Node B (eNB), the device comprising: means for sensing for a predetermined time period if any physical uplink shared channels (PUSCH) are idle with the eNB for uplink (UL) synchronization; means for providing a unique UE identification in a PUSCH transmission; and means for communicating the PUSCH transmission in one of the idle PUSCH channels for contention free communication with the eNB for uplink synchronization.

Example 79 includes a device to achieve low latency synchronization with a user equipment (UE), the device comprising: means for receiving a physical uplink shared channel (PUSCH) transmission for the UL synchronization from the UE following the UE sensing for a predetermined time period a PUSCH channel is idle with the anchor eNB; means for receiving a unique UE identification in the PUSCH transmission; and means for determining an identify of the UE by the unique UE identification in the PUSCH transmission for the contention free UL synchronization Example 79 includes an apparatus of an anchored enhanced Node B (eNB) operable to contention free uplink (UL) synchronization with a user equipment (UE), the apparatus configured to: process a physical uplink shared channel (PUSCH) transmission, received from the UE, following the idle PUSCH channel sensing for a predetermined time period; process a unique UE identification in the PUSCH transmission received by the eNB; determine an identify of the UE by the unique UE identification in the PUSCH transmission for the contention free UL synchronization; and perform a blind UE detection based on demodulation reference signal (DMRS).

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module do not have to be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology can be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the technology. One skilled in the relevant art can recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it can be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable for low latency synchronization with an enhanced Node B (eNB), the apparatus comprising:
memory and one or more processors configured to:
sense for a predetermined time period if any physical uplink shared channels (PUSCH) are idle;
provide a unique UE identification in a PUSCH transmission;
communicate the PUSCH transmission in one of the idle PUSCH channels for contention-free communication with the eNB for uplink synchronization without uplink synchronization scheduling;
use a preamble signal for sensing the PUSCH channels are idle, wherein the preamble signal includes a radio network temporary identifier (RNTI) or a DMRS signal for demodulation;
sense if a current transmission attempt is unsuccessful, wherein the UE performs a listen before talk procedure consisting of a clear channel assessment (CCA) and an extended clear channel assessment (ECCA) by regenerating a new backoff counter in a next transmission attempt; and
perform the listen before talk procedure starting at symbol 0 for a specified number of symbols M, wherein the PUSCH transmission starts from symbol M+1 and ends at a predetermined symbol within a subframe, wherein M is a positive integer, wherein a sounding reference signal (SRS) is transmitted on the predetermined symbol, and wherein puncturing of the predetermined symbol is eliminated.

2. The apparatus of claim 1, wherein the one or more processors are further configured to sense a PUSCH channel is idle if a sensed energy is below a predefined threshold.

3. The apparatus of claim 1, wherein the one or more processors are further configured to perform the CCA or the ECCA for multiples sensing granularity slits known to the UE or perform the CCA or the ECCA by signaling the eNB.

4. The apparatus of claim 1, wherein the one or more processors are further configured to sense if any of the PUSCH channels are idle during the CCA and the ECCA, wherein a duration of the CCA or the ECCA is based upon minimum sensing granularity.

5. The apparatus of claim 4, wherein the one or more processors are further configured to sense a PUSCH channel is idle if a sensed energy is below a predefined threshold during the duration of the CCA or the ECCA.

6. The apparatus of claim 4, wherein the one or more processors are further configured to:
perform the ECCA by spanning over a plurality of sensing granularity slits, wherein a number of the plurality of sensing granularity slits that the ECCA spans over is determined by a contention window (CW);
determine a number of the plurality of sensing granularity slits by generating a random number from 1 to the number of the plurality of sensing granularity slits determined by the CW that the ECCA spans over determined as a backoff counter; and
reduce the number of the plurality of sensing granularity slits that the ECCA spans over each time a PUSCH channel is sensed as idle.

7. The apparatus of claim 6, wherein the one or more processors are further configured to:
reduce an ECCA counter by a factor of one (1) each time the PUSCH channel is sensed as idle;
process, for transmission, a reservation signal to align to the symbol boundary; or
process, for transmission, the reservation signal to start a next symbol.

8. The apparatus of claim 7, wherein the one or more processors are further configured to sense if a current transmission attempt is unsuccessful, wherein the UE continues to perform the ECCA in a subsequent subframe using a current counter of an ECCA counter without generating a new random number.

9. The apparatus of claim 1, wherein the one or more processors are further configured to reserve one of the PUSCH channels that is idle for communicating the PUSCH transmission.

10. The apparatus of claim 9, wherein the unique UE identification is one of a cell radio network temporary identifier (C-RNTI) or a radio network temporary identifier (RNTI).

11. The apparatus of claim 1, wherein communicating the PUSCH transmission is performed upon arrival of an UL packet at a media access control (MAC) buffer of the UE.

12. The apparatus of claim 1, wherein the PUSCH transmission consists of a plurality of symbols corresponding to subcarriers in a resource block, wherein the one or more processors is further configured to use at least one of the plurality of symbols for sensing the PUSCH channel is idle while using a remaining number of the plurality of symbols for the PUSCH transmission.

13. The apparatus of claim 1, wherein the one or more processors are further configured to use Modulation Coding Scheme (MCS) for the UL transmission, wherein the MCS is predefined by a lowest MCS.

14. The apparatus of claim 1, wherein the one or more processors are further configured to communicate the PUSCH transmission in a hybrid automatic repeat request (HARQ) operation.

15. The apparatus of claim 14, wherein the one or more processors are further configured to process, for retransmission, the PUSCH transmission upon the UE receiving a negative acknowledgment (NACK) in a physical HARQ indicator channel (PHICH).

16. The apparatus of claim 15, wherein the retransmission of the PUSCH transmission is based on UL grant or based on a new data indicator (NDI) toggling in the UL grant.

17. The apparatus of claim 1, wherein the one or more processors are further configured to communicate the PUSCH transmission in a configured time or frequency region.

18. The apparatus of claim 1, wherein the one or more processors are further configured to adaptively split the UE from an alternative UE into different contention zones having different contention windows, wherein each of the contention zones are dynamically or semi-statically adapted according to latency requirements.

19. The apparatus of claim 1, wherein the apparatus includes at least one of an antenna, a touch sensitive display screen, a speaker, a microphone, a graphics processor, an application processor, a baseband processor, an internal memory, a non-volatile memory port, and combinations thereof.

20. The apparatus of claim 1, wherein the DMRS signal is removed during a PUSCH transmission burst.

21. The apparatus of claim 1, wherein the DMRS signal is removed during a PUSCH transmission burst.

22. The apparatus of claim 1, wherein the predetermined symbol is symbol 14.

23. An apparatus of an anchored enhanced Node B (eNB) operable to achieve contention free uplink (UL) synchronization with a user equipment (UE), the apparatus comprising:
one or more processors configured to:
process a physical uplink shared channel (PUSCH) transmission, received from the UE, following the idle PUSCH channel sensing for a predetermined time period, wherein the PUSCH transmission is received from the UE without UL synchronization scheduling;
process a unique UE identification in the PUSCH transmission received by the eNB;
determine an identify of the UE by the unique UE identification in the PUSCH transmission for the contention free UL synchronization; and
process a preamble signal, received from the UE for sensing the PUSCH channels are idle, wherein the preamble signal includes a radio network temporary identifier (RNTI) or a DMRS signal for demodulation;
wherein the PUSCH transmission starts from symbol M+1 and ends at a predetermined symbol within a subframe, wherein M is a positive integer corresponding to a number of symbols used by the UE for a listen before talk procedure, wherein a sounding reference signal (SRS) is transmitted on the predetermined symbol, wherein puncturing of the predetermined symbol is eliminated.

24. The apparatus of claim 23, wherein the one or more processors are further configured to perform a blind UE detection based on demodulation reference signal (DMRS).

25. The apparatus of claim 23, wherein the one or more processors are further configured to generate a demodulation reference signal (DMRS) sequence using a Constant Amplitude Zero Autocorrelation Waveform (CAZAC) sequence, wherein the CAZAC sequence is a Zadoff-Chu (ZC) sequence.

26. The apparatus of claim 23, wherein the one or more processors are further configured to process the PUSCH transmission that is received in one of the idle PUSCH channels from the UE.

27. The apparatus of claim 23, wherein the one or more processors are further configured to process a reserve signal, that is received from the UE, for reserving one of a plurality of PUSCH channels that is idle for receiving the PUSCH transmission.

28. The apparatus of claim 23, wherein the one or more processors are further configured to receive from the UE the PUSCH transmission upon arrival of an UL packet at a media access control (MAC) buffer of the UE.

29. The apparatus of claim 23, wherein the one or more processors are further configured to:
use Modulation Coding Scheme (MCS) for the UL transmission, wherein the MCS is predefined by a lowest MCS;
process the PUSCH transmission received in a hybrid automatic repeat request (HARQ) operation; and
process, for transmission, a negative acknowledgment (NACK) in a physical HARQ indicator channel to the UE to trigger the UE to retransmit the PUSCH transmission.

30. The apparatus of claim 23, wherein the one or more processors are further configured to:
process, for transmission, an UL grant or a new data indicator (NDI) toggling in the UL grant to the UE for the retransmission of the PUSCH transmission;
process the PUSCH transmission received in a configured time or frequency region; and
dynamically or semi-statically adapt or assign a contention window upon determining a cell collision between the UE and an alternative UE by creating a new contention zone having a different contention window or reducing a currently used contention zone for successfully receiving the PUSCH transmission.

31. The apparatus of claim 23, wherein the DMRS signal is removed during a PUSCH transmission burst.

32. The apparatus of claim 23, wherein the predetermined symbol is symbol 14.

33. An apparatus of an anchored enhanced Node B (eNB) operable to perform contention free uplink (UL) synchronization with a user equipment (UE), the apparatus comprising:
one or more processors configured to:
process a physical uplink shared channel (PUSCH) transmission, received from the UE, following the idle PUSCH channel sensing for a predetermined time period, wherein the PUSCH transmission is received from the UE without UL synchronization scheduling;
process a unique UE identification in the PUSCH transmission received by the eNB;
determine an identify of the UE by the unique UE identification in the PUSCH transmission for the contention free UL synchronization;
perform a blind UE detection based on a demodulation reference signal; and
process a preamble signal, received from the UE for sensing the PUSCH channels are idle, wherein the preamble signal includes a radio network temporary identifier (RNTI) or a DMRS signal for demodulation;
wherein the PUSCH transmission starts from symbol M+1 and ends at a predetermined symbol within a subframe, wherein M is a positive integer corresponding to a number of symbols used by the UE for a listen before talk procedure, wherein a sounding reference signal (SRS) is transmitted on the predetermined symbol, wherein puncturing of the predetermined symbol is eliminated.

34. The apparatus of claim 33, wherein the one or more processors are further configured to receive from the UE the PUSCH transmission upon arrival of an UL packet at a media access control (MAC) buffer of the UE.

35. The apparatus of claim 33, wherein the predetermined symbol is symbol 14.

* * * * *